(12) United States Patent
Nystrom et al.

(10) Patent No.: US 11,835,249 B2
(45) Date of Patent: Dec. 5, 2023

(54) INDICATOR NETWORK FOR MANAGING VENTILATION, HEATING AND AIR CONDITIONING COMPONENTS OF BUILDINGS

(71) Applicant: Ventacity Systems Inc., Portland, OR (US)

(72) Inventors: Patrick Joseph Nystrom, Corbett, OR (US); Alec Yoshizumi, Troutdale, OR (US)

(73) Assignee: Ventacity Systems Inc., Portland, OR (US)

(*) Notice: Subject to any disclaimer, the term of this patent is extended or adjusted under 35 U.S.C. 154(b) by 65 days.

(21) Appl. No.: 17/157,116

(22) Filed: Jan. 25, 2021

(65) Prior Publication Data

US 2021/0231337 A1 Jul. 29, 2021

Related U.S. Application Data

(60) Provisional application No. 62/965,745, filed on Jan. 24, 2020.

(51) Int. Cl.
*F24F 11/65* (2018.01)
*G06F 9/54* (2006.01)
(Continued)

(52) U.S. Cl.
CPC .............. *F24F 11/65* (2018.01); *F24F 11/54* (2018.01); *F24F 11/56* (2018.01); *F24F 11/58* (2018.01);
(Continued)

(58) Field of Classification Search
CPC .... G05B 2219/2642; G05B 2219/2614; G05B 2219/25022; G05B 23/0221;
(Continued)

(56) References Cited

U.S. PATENT DOCUMENTS

| | | | |
|---|---|---|---|
| 6,735,619 B1* | 5/2004 | Sawada | H04L 67/12 |
| | | | 709/227 |
| 6,891,838 B1* | 5/2005 | Petite | H04L 12/2836 |
| | | | 340/870.02 |

(Continued)

FOREIGN PATENT DOCUMENTS

| | | |
|---|---|---|
| WO | 2018140330 A1 | 8/2018 |
| WO | 2021151086 A1 | 7/2021 |

OTHER PUBLICATIONS

International Searching Authority, International Search Report and Written Opinion, PCT Patent Application PCT/US2021/014936, dated Apr. 6, 2021, 9 pages.

*Primary Examiner* — Darrin D Dunn
(74) *Attorney, Agent, or Firm* — Perkins Coie LLP

(57) ABSTRACT

An air processing system is provided that is configured to monitor and control the quality and temperature of air within a building. The air processing system includes at least one temperature adjustment assembly (e.g., a heating/cooling system) used to heat or cool the air within the building and at least one dedicated outdoor air system ventilator used to circulate fresh air within the building wherein the air processing system is separate from the temperature adjustment assembly. The air processing system also includes an intelligent gateway formed as part of the ventilator and connected to the temperature adjustment assembly and the ventilator so as to monitor and control their operating conditions. The intelligent gateway may send the operating conditions and any sensor measurements to a cloud computing server that a user or technician can use to interface with the air processing system.

20 Claims, 15 Drawing Sheets

(51) Int. Cl.
  *G06F 16/22* (2019.01)
  *F24F 11/63* (2018.01)
  *F24F 11/54* (2018.01)
  *F24F 11/56* (2018.01)
  *G06F 16/23* (2019.01)
  *F24F 11/58* (2018.01)
  *F24F 11/49* (2018.01)
  *F24F 110/20* (2018.01)
  *F24F 120/10* (2018.01)
  *F24F 110/70* (2018.01)
  *F24F 110/40* (2018.01)
  *F24F 110/10* (2018.01)

(52) U.S. Cl.
  CPC .............. *F24F 11/63* (2018.01); *G06F 9/541* (2013.01); *G06F 16/2282* (2019.01); *G06F 16/2358* (2019.01); *G06F 16/2365* (2019.01); *F24F 11/49* (2018.01); *F24F 2110/10* (2018.01); *F24F 2110/20* (2018.01); *F24F 2110/40* (2018.01); *F24F 2110/70* (2018.01); *F24F 2120/10* (2018.01)

(58) Field of Classification Search
  CPC ........ G05B 19/408; G05B 2219/15052; G05B 2219/25067; G05B 2219/31093; G05B 2219/31324; G05B 23/027; G05B 15/02; G05B 19/042; G05B 19/418; G05B 2219/163; G05B 2219/32142; G05B 2219/32161; H04L 67/12; H04L 67/125; H04L 12/66; H04L 41/12; H04L 12/2807; H04L 67/025; H04L 12/2803; H04L 12/2816; H04L 67/51; H04L 65/102; H04L 67/02; H04L 12/2812; H04L 67/34; H04L 41/0803; H04L 41/0853; H04L 41/22; H04L 67/104; H04L 67/141; H04L 67/16; G06F 16/288; H04W 88/16; H04W 8/005; H04W 8/22
  See application file for complete search history.

(56) References Cited

U.S. PATENT DOCUMENTS

| | | | |
|---|---|---|---|
| 9,571,345 B2* | 2/2017 | Ghosh | H04L 12/2827 |
| 2006/0184380 A1* | 8/2006 | Hall | H04L 41/0803 |
| | | | 709/224 |
| 2008/0015740 A1* | 1/2008 | Osann | G05B 15/02 |
| | | | 700/276 |
| 2016/0211984 A1* | 7/2016 | Takada | H04L 12/2834 |
| 2018/0076978 A1 | 3/2018 | Schubert et al. | |
| 2018/0309818 A1* | 10/2018 | Park | H04L 43/08 |
| 2018/0350226 A1* | 12/2018 | Martin | H04L 69/08 |
| 2019/0204817 A1* | 7/2019 | Zhu | B07C 3/18 |
| 2019/0266276 A1 | 8/2019 | Patel et al. | |
| 2020/0162700 A1* | 5/2020 | Kim | H04N 21/41407 |
| 2021/0056410 A1* | 2/2021 | Jha | G06N 3/08 |
| 2021/0082276 A1* | 3/2021 | Martin | H04W 24/04 |
| 2021/0208559 A1* | 7/2021 | Park | G05B 15/02 |
| 2021/0231340 A1 | 7/2021 | Nystrom et al. | |
| 2022/0138183 A1* | 5/2022 | Park | G06F 16/2379 |
| | | | 709/223 |

* cited by examiner

INDICATOR NETWORK FOR MANAGING VENTILATION, HEATING AND AIR CONDITIONING COMPONENTS OF BUILDINGS

CROSS REFERENCE TO RELATED APPLICATIONS

This application claims priority to U.S. Patent Application No. 62/965,745, filed on Jan. 24, 2020, entitled SYSTEMS AND METHODS FOR INTEGRATING AND COMMUNICATING WITH VENTILATION AND HEATING COMPONENTS, which is hereby incorporated by reference in its entirety.

TECHNICAL FIELD

The present disclosure relates to sentient systems and methods for providing on-demand ventilation management using, for example, heat recovery ventilation (HRV) and/or energy recovery ventilation (ERV).

BACKGROUND

Seven percent of the coal, oil and natural gas burned in the U.S. is used to heat, cool, and ventilate commercial buildings. The majority of commercial buildings employ a heating, ventilation, and cooling (HVAC) system to regulate the temperature and indoor air quality of the buildings. Typically, these HVAC systems combine separate heating, cooling, and ventilation systems into a single HVAC system responsible for monitoring and controlling the heating, cooling, and ventilation needs of the buildings. However these combined systems are inherently inefficient and use more energy than necessary. For example, using a combined HVAC system to ventilate a building requires pumping in fresh air from the outside, heating or cooling the fresh air to the desired temperature, and pumping stale air within the building outside. As a result, large amounts of energy are required to condition the fresh air while the stale air, which is already conditioned and at the desired temperature, is pumped outside with little to none of the energy used to condition the stale air being recovered.

HVAC systems are often coupled to centralized air systems having air ducts that are used to distribute conditioned air from the HVAC systems to the rooms of a building. This can often leave some of the rooms too hot while leaving other areas too cold. The HVAC systems therefore require a large amount of energy to provide conditioned fresh air to the entirety of the building and to over-condition the fresh air (i.e., heat the fresh air to a temperature well-above a desired temperature or cool the fresh air to a temperature well-below the desired temperature) to ensure that all of the rooms are at the desired temperature. Further, these systems provide conditioned air to the entirety of a building even if only a small portion of the building is occupied, wasting large amounts of energy to heat and/or cool rooms that are unoccupied. As such, combined HVAC systems coupled to centralized air systems are inefficient and ineffective, requiring large amounts of energy to provide conditioned air to an entire building and failing to recapture the energy used to heat the stale air during ventilation.

It would be advantageous to provide an air-management system capable of selectively heating, cooling, and ventilating different areas of a building in order to decrease the amount of energy required to meet air quality and air temperature requirements.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
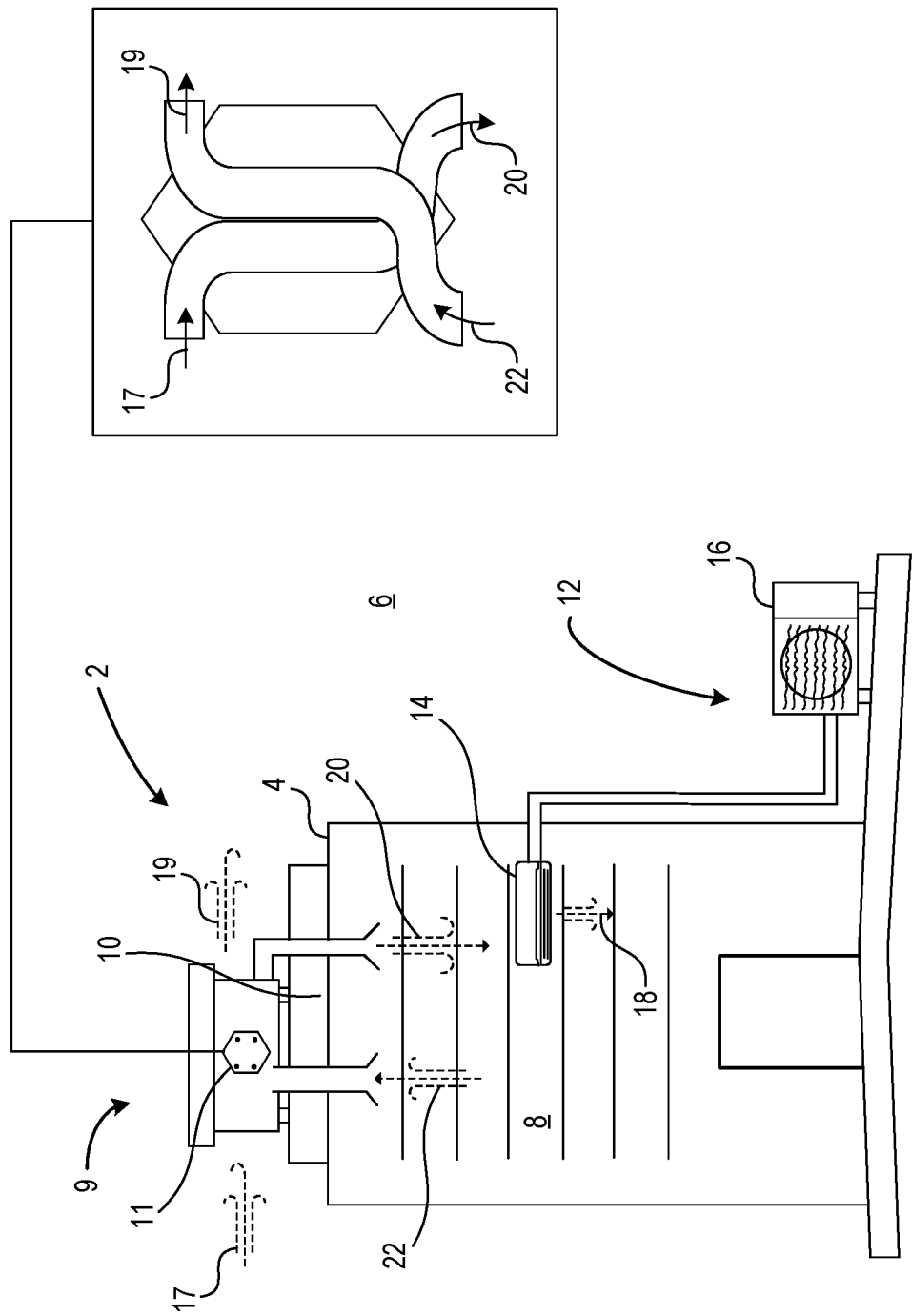
FIG. 1 is a diagram showing a building having an air processing system configured in accordance with aspects of the disclosure.

HVAC systems are becoming more complex and are being used to measure different metric/indicators to increase efficiency and reliability. The energy consumed by HVAC systems has also been increasing over the last decades. Improving efficiency and reliability of HVAC systems has posed challenges for modeling, monitoring, and optimizing HVAC systems. Conventional systems do not provide an efficient way to monitor and track the impact of changes in one or more sensor values on higher-level statuses. For example, when a value of a temperature sensor on a particular floor of a building changes, it can have varying impacts on higher-level statues of the floor, zone, building, site, geographic region, country, and so on. Currently, there is no scalable system to monitor and track such changes. Also, conventional systems typically hard code the impact a sensor value change has on higher-level statuses—both to determine which higher-level statuses are impacted, and the magnitude of the impact. As a result, conventional systems are unable to scale well and are difficult to maintain, since any change to the hierarchical structure (which may change, for example, based on application requirements for different market segments), require changing the hard-coded calculation code.

To solve these and other problems with conventional systems, an air processing system having an intelligent gateway (IG) is disclosed. While the discussion here primarily discusses sentient systems and methods for providing on-demand ventilation management using, for example, heat recovery ventilation and/or energy recovery ventilation, one of skill in the art will understand that the disclosed systems and methods can also be applied to solve similar problems occurring in other distributed metrics management systems, such as network of drones (e.g., for delivery), computer network management, oil drilling/refineries, factory automation (SCADA), network of IoT devices, and so on.

According to aspects of the disclosure, ventilation units can be equipped with intelligent gateway technology, providing secure, round-the-clock remote performance monitoring and fault alerts via an automatically configured mobile internet connection. With the intelligent gateway, the ventilation units are able to independently monitor a variety of comfort-related conditions/indicators, including indoor/outdoor temperature, relative humidity, and occupancy status. Additionally, the intelligent gateway is configured to connect with sensors to automatically detect and reduce unhealthy levels of CO2 or volatile organic compounds (VOCs), to maintain a healthy indoor environment. Accordingly, a method and system of providing on-demand dedicated outdoor air systems (DOAS) with heat recovery ventilation (HRV) ventilation management separate from heating/cooling systems is described in detail herein in accordance with embodiments of the present technology. Numerous specific details are set forth in the following description and figures to provide a thorough and enabling description of embodiments of the invention. One skilled in the relevant art, however, will recognize that the invention can be practiced without one or more of the specific details. In other instances, well-known structures or operations are not shown or are not described in detail to avoid obscuring aspects of the invention. In general, alternatives and alternate embodiments described herein are substantially similar to the previously described embodiments, and common elements are identified by the same reference numbers.

FIG. 1 is a diagram of a building 4 having an air processing system 2 that includes a dedicated outdoor air ventilation system 9 separated from a temperature adjustment assembly. In the embodiment shown in FIG. 1, the temperature adjustment assembly is a heating/cooling assembly 12. The air ventilation system 9 and the heating/cooling assembly 12 work together to condition outside air 6 taken in from outside of the building 4 in order to regulate and control a variety of comfort-related conditions of indoor air 8 within the building 4, including temperature, relative humidity, and occupancy status. The air ventilation system 9 includes a ventilator 10 configured to take in fresh air 17 from the outside air 6 and expel stale return stale air 19 into the outside air 6. The heating/cooling assembly 12 includes an indoor unit 14 coupled to a heat pump 16, where the indoor unit 14 is configured to expel heated/cooled air 18 while the heat pump 16 expels excess heat from the indoor unit 14. In FIG. 1, the ventilator 10 is depicted as a roof top unit configured to be positioned on the roof of the building 4 while the heat pump 16 is depicted as being positioned on the ground adjacent to the building 4. In other embodiments, the heat pump 16 may also be configured as a roof top unit, an integrated building unit, an attached unit or other such configuration as may be understood by one skilled in the art.

The air ventilation system 9 is configured to ventilate the building 4 in order to aid in adjusting the temperature, humidity, pressure, and composition of the indoor air 8. To do this, the ventilator 10 takes in fresh air 17 from the outside air 6, conditions the fresh air 17 in a heat exchanger 11 to modulate the temperature of the fresh air intake to approach the temperature of the indoor building air 8 prior to circulating conditioned fresh air 20 within the building 4. Concurrently, the air ventilation system 9 flows stale return air 22 from the indoor air 8 through the heat exchanger 11 in the counterflow heat exchange with the incoming fresh air 17 to condition the incoming air to approach the temperature of the indoor building air 8 prior to expelling the stale air 19 outside of the building 4. In this configuration, temperature within the building remains stable even while exchanging fresh air into the building. However, on hot or cold days (i.e., when the difference in temperature between the outside air 6 and the indoor air 8 is large), the temperature of the stale return air 22 may be significantly different than the temperature of the fresh air 17 and the fresh air 17 must be heated or cooled to reach the desired temperature of the indoor air 8. To reduce the amount of energy required to heat up the fresh air, the ventilator 10 includes the heat exchanger 11 configured to recover heat from the stale return air 22 and to condition the fresh air 17 using the recovered heat so that the conditioned fresh air 20 emitted into the building 4 is at or near the desired temperature and also activates the separate heating/cooling assembly 12.

According to embodiments of the disclosure, the heat exchanger 11 may be an aluminum countercurrent or counterflow heat exchanger having air channels through which air travels. The ventilator 10 and heat exchanger 11 are configured such that the fresh air 17 flows through the some of the air channels in a first direction while the stale return air 22 flows through other air channels in an opposing second direction. As the air flows through the air channels, thin aluminum walls that separate adjacent air channels conduct heat between the adjacent air channels. In this way, thermal energy previously used to condition the stale return air 22 is recovered by the heat exchanger 11 and used to condition the fresh air 17 (e.g., heat up or cool down) before it enters the building 4. As a result, the conditioned fresh air 20 emitted into the building is at or near the temperature of the stale return air 22 (i.e., the desired temperature of the indoor air 8) with little to no energy being used to heat (or cool) the fresh air 17. To ensure that the small differences in temperature between the conditioned fresh air 20 and the desired temperature do not affect the temperature of the indoor air 8, the heating/cooling assembly 12 may be used to maintain the temperature of the indoor air 8. However, because the conditioned fresh air 20 emitted into the building 4 is already at or near the desired temperature, not much heating (or cooling) is required from the assembly 12 to maintain the desired temperature, thereby reducing the amount of energy required to maintain the temperature of the indoor air 8 while the air ventilation system 9 circulates fresh air and expels stale air.

According to further aspects of the disclosure, the dedicated outdoor air ventilation system include heat recovery ventilation (HRV) and/or energy recovery ventilation (ERV), having countercurrent heat exchangers that are up to 93% efficient, allowing the delivery of fresh outdoor air within a comfortable few degrees of room temperature, reducing heating and cooling loads and heating, ventilation, air conditioning, and refrigeration (HVACR) equipment energy requirements by up to 50%.

According to further embodiments of the disclosure, the system includes an intelligent dedicated outdoor air system (DOAS) (ventilation system) with ultra-efficient heat recovery integrated with a smart analytic optimization engine platform that learns and responds to unique thermal characteristics of the building, the indoor air quality (IAG) characteristics in the building, occupancy, other factors including its relationship with the dynamic external environment. This system can further include an integrated set of communication options including cellular data, WiFi, Bluetooth, usb, Ethernet, modbus, canbus and BACNet.

According to further embodiments of the disclosure, the system is configured to create a balanced/neutral air pressure within the building and can log information on essentially all the outside air that enters the building and all the inside air that exits the building. According to further aspects, the system includes a useful dataset of knowledge that can provide important insights into the building performance and ways to optimize the performance. Importantly, the system allows buildings to be designed that reduce energy use by 50% by separating ventilation from air conditioning and applying heat recovery technology along with heat pumps to a building. According to aspects of the system, a UL, CSA and passive house certified counterflow HRV with an intelligent dedicated outdoor air system combine ventilation and heat recovery to provide health, comfort and energy savings advantages. For example, harmful elements are diluted or exhausted, moisture mitigation discourages mold growth and fresh air is provided on demand. Further, quiet operation, even temperatures without drafts and fresh indoor environment is provided. Still further, the overall energy load on the building is reduced, up to 93% of the exhaust heat is recovered, air movement is efficient and extremely low fan energy is provided.

According to further aspects of the disclosure, a split ventilation and heating/air conditioning system provides a more energy efficient system. A dedicated outdoor air system (DOAS) supplies only the outdoor ventilation air necessary to maintain high ventilation standards, while independent heating and cooling coils inside the building take care of temperature conditioning the space. Since a smaller volume of air needs to be moved in a split system (reduced load), a smaller capacity air handling unit can be used, reducing the fan energy consumed. And, since the amount of outside air introduced can be modulated for demand, less air is needed for heating and cooling, resulting in further energy consumption savings.

Figure 2:
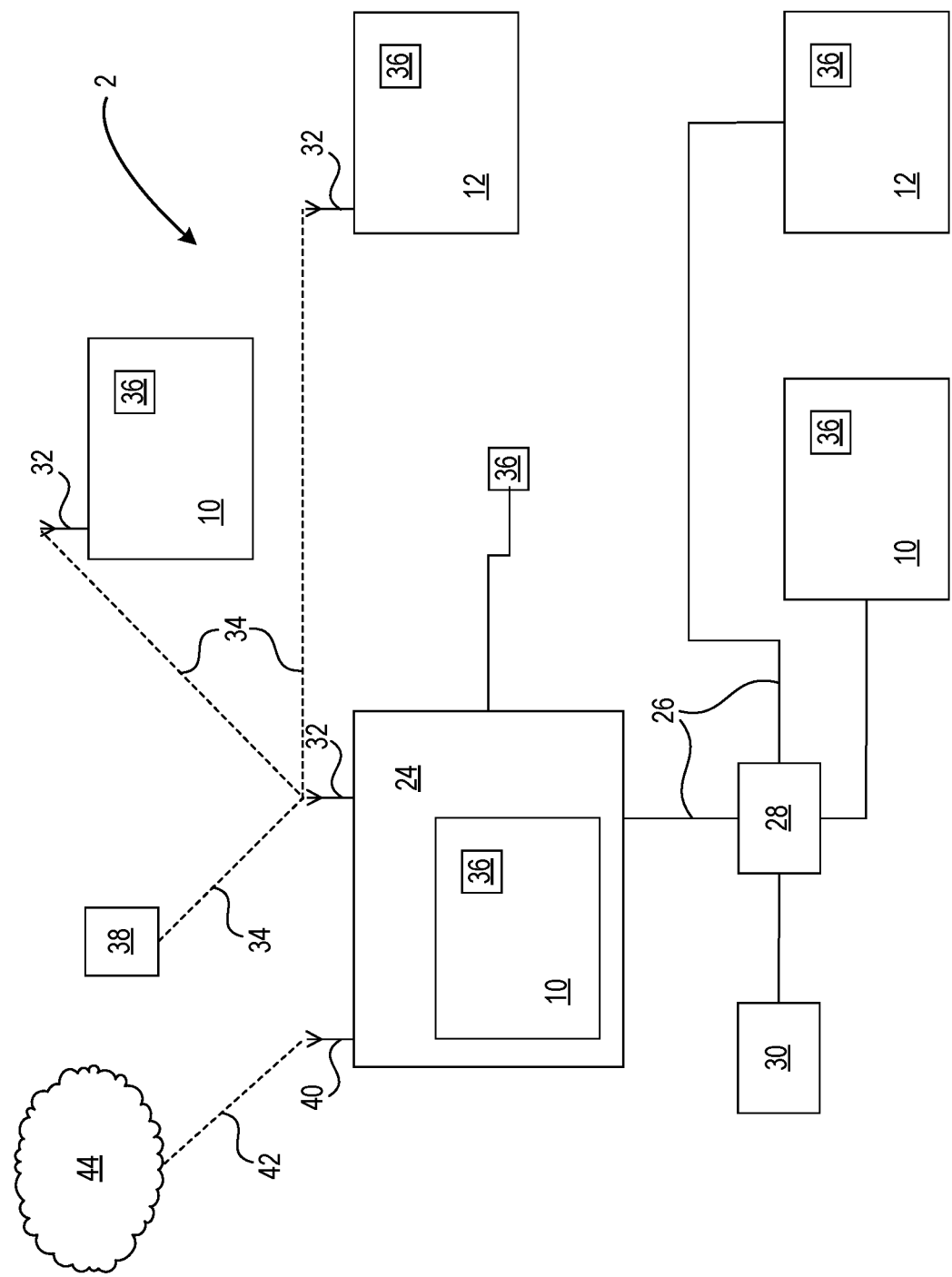
FIG. 2 is a diagram showing an air processing system capable of selectively and intelligently heating, cooling, and ventilating different parts of a building configured in accordance with aspects of the disclosure.

As illustrated in the figures, to control and monitor the indoor air quality and the temperature of the indoor air 8, the air processing system 2 includes a control hub operatively coupled to the air ventilation system 9 and the heating/cooling assembly 12. FIG. 2 is a diagram of the air processing system 2 having an intelligent gateway (IG) 24 configured to operate as the control hub and to coordinate the ventilation, heating, and cooling of a building. The intelligent gateway 24 is a robust and reliable Linux-based computer that is mountable to a DIN rail within a ventilator 10. The intelligent gateway 24 includes system memory and storage, power management systems, and at least one processor. For large commercial buildings where the air processing system 2 includes multiple ventilators 10 and multiple heating/cooling assemblies 12, each of the ventilators 10 and heating/cooling assemblies 12 is coupled to a single intelligent gateway 24. The single intelligent gateway 24 is capable of monitoring the performance of each ventilator 10 and heating/cooling assembly 12 independently in order to control and monitor the air quality and temperature of a building.

Each of the ventilators 10 and heating/cooling assemblies 12 may include one or more sensors 36 that are used to measure and record various comfort-related qualities of the indoor air 8 and the outdoor air 6 (FIG. 1), such as the temperature, pressure, humidity, quantities of $CO_2$, CO, and/or volatile organic compounds present in the air, and other qualities. The air processing system 2 may also include additional sensors 36 not included with a heating/cooling assembly 12. The sensor data is provided to the intelligent gateway 24 and the intelligent gateway 24 evaluates the sensor data to determine if the current quality of air within the building is acceptable. After evaluating the sensor data, the intelligent gateway 24 may determine that an adjustment to the indoor air needs to be made in order to satisfy quality and temperature requirements. For example, a given building may include multiple heating/cooling assemblies 12 located in various rooms and areas where the indoor unit 14 for each of the heating/cooling assemblies 12 includes a sensor 36 configured to measure the temperature of the air surrounding the unit 14 (e.g., a thermometer). The measured temperature values are transmitted to the intelligent gateway 24 and the intelligent gateway 24 compares the temperatures values to a predetermined temperature value indicative of a desired temperature. If one of the measured temperature values is significantly hotter than the predetermined temperature value, the intelligent gateway 24 may send a signal to the corresponding heating/cooling assembly 12 to increase the cooling output (or decrease the heating output) of the assembly 12 so as to decrease the temperature of the surrounding air. Conversely, if one of the measured temperature values is significantly colder than the desired temperature, the intelligent gateway 24 may send a signal to the corresponding assembly 12 to increase the heating output (or decrease the cooling output) of the assembly 12 so as to increase the temperature of the surrounding air.

To facilitate communication between the intelligent gateway 24, ventilators 10, and the heating/cooling assemblies 12, the intelligent gateway 24 may act as a general purpose Internet Protocol (IP) router for Local Area Networks (LAN), Wireless Local Area Networks (WLAN), and/or Wide Area Networks (WAN) and may have configurable firewall, network address translation, and port forwarding capabilities. In this way, the intelligent gateway 24 is able to monitor and control additional ventilators 10 and heating/cooling assemblies 12. The intelligent gateway 24, ventilators 10, and heating/cooling assemblies 12 include communication circuitry that allows for communication between the intelligent gateway 24, ventilators 10, and assemblies 12. For example, the intelligent gateway 24, ventilators 10, and the assemblies 12 each include antennas 32 that enable the establishment of wireless connections 34 between the intelligent gateway 24 and the ventilators 10 and/or assemblies 12. In some embodiments, the intelligent gateway 24 may establish a WLAN (e.g., a Wi-Fi network) over which the intelligent gateway 24, ventilators 10, and assemblies 12 can communicate. In other embodiments, the wireless connections 34 may be Bluetooth connections that enable direct wireless communication between the intelligent gateway 24 and the ventilators 10/assemblies 12.

Instead of communicating via wireless connections 34, the intelligent gateway 24 may communicate via wired connections 26. The wired connections 26 may be Ethernet connections and the intelligent gateway 24, ventilators 10, and heating/cooling assemblies 12 may each include Ethernet connector ports that receive Ethernet cables. The air processing system 2 may also include an Ethernet switch 28 coupled between the intelligent gateway 24 and the various components and that is configured to receive multiple Ethernet cables so that the intelligent gateway 24 is able to communicate with multiple components via wired connections 26 simultaneously. The Ethernet switch may also be used to couple additional networks 30 to the intelligent gateway 24. These additional networks may include private Building Automation and Control Networks (BACNet) or IP networks, as examples. For example, the Ethernet switch 28 may be coupled to a private BACNet that enables the intelligent gateway 24 to interface with Building Management Systems and to interface with third-party HVAC components (e.g., other temperature adjustment assemblies) that are incapable of directly communicating with the intelligent gateway 24. An IP network connected to the Ethernet switch 28 may be configured as a WLAN that enables users to wirelessly connect to the IP network and to allow those users to access the Internet or local intranet. In some embodiments, the ventilators 10 and/or heating/cooling assemblies 12 may establish wireless connections 32 with the WLAN and communicate with the intelligent gateway 24 via this additional network 30 in lieu of using the antenna 32 included in the intelligent gateway 24.

The intelligent gateway 24, the ventilators 10, and the heating/cooling assemblies 12 may communicate using secure Modbus Transmission Control Protocol (TCP). Modbus TCP is a common communications protocol used in industrial control systems and designed to link a controller to various sensors and components. However, traditional Modbus TCP is unencrypted and communications between two components over a public network (e.g., a public IP network) using Modbus TCP is intermingled with other traffic on the network such that all nodes on the network can see the Modbus TCP traffic. As a result, the Modbus TCP traffic is susceptible to snooping and tampering when transmitted via a public and unsecured network, potentially resulting in the loss of data privacy and exposing the system to fraudulent traffic. To ensure that communications between the intelligent gateway 24, the ventilators 10 and the heating/cooling assemblies 12 remains secure, the air processing system 2 may communicate using Secure Modbus TCP, which utilizes public key encryption and certificates to encrypt the data. In this way, any traffic between the intelligent gateway 24, the ventilators 10 and the heating/cooling assemblies 12 that is intermingled with other traffic on a Wi-Fi and/or public Ethernet network remains encrypted and secured, effectively establishing a virtual private channel between the system components. This ensures that the data remains secure and the air processing system 2 is not susceptible to fraudulent traffic.

The intelligent gateway 24 may also include various expansion buses and ports capable of coupling the intelligent gateway 24 to additional components that aid in increasing the communication, processing, and storage capabilities of the intelligent gateway 24. For example, the intelligent gateway 24 includes a microSD port that enables expandable external data storage and may be used to upload new software and firmware to the intelligent gateway 24. The intelligent gateway 24 may also include one or more USB ports used for connecting external storage and human interface devices (e.g., a keyboard) to the intelligent gateway 24. An isolated RS-485 transceiver may also be incorporated to enable communication between the intelligent gateway 24 and at least some of the Modbus-compatible components. The intelligent gateway 24 also includes an expansion bus that enables the integration of additional modules that may be attached to the intelligent gateway 24. The expansion bus may include power outputs to power the additional modules, a controller area network (CAN) bus and/or an RS485 connector to enable communication between the intelligent gateway 24 and the additional modules, and a USB connector for supporting a LoRa gateway used to wirelessly communicate with sensors, actuators, and other components of smart buildings.

As previously discussed, the intelligent gateway 24 is operatively connected to the ventilators 10, the heating/cooling assemblies 12, sensors 36, and other components of the air processing system 2 in order to monitor the quality and temperature of the air within the building 4 and to enable direct control of the ventilators 10 and heating/cooling assemblies 12 so that the quality and temperature of the air may be adjusted. The intelligent gateway 24 is also capable of monitoring the performance of the various air processing system 2 components. For example, the ventilators 10 and the heating/cooling assemblies 12 may include filters configured to remove particulate matter and other contaminants from the air. The ventilators 10 and the heating/cooling assemblies 12 are capable of monitoring the performance and filtering capabilities of the individual filters and can report the performance characteristics of the individual filters to the intelligent gateway 24. In this way, the intelligent gateway 24 is capable of cataloging the performance data of the individual filters and can notify a user or technician monitoring the air processing system 2 when a filter needs to be changed. The intelligent gateway 24 also monitors the heat transfer efficiency of the heat exchanger 11, the air throughput of the ventilators, and the power and energy used by the ventilators 10 and the heating/cooling assemblies 12, records these operating conditions and provides the operating conditions to a user or technician, enabling real-time performance monitoring of the various components of the air-processing system.

To account for differing air quality and temperature requirements, the air processing system 2 may be capable of operating in different modes. For example, during the day when the building 4 is occupied, the ventilators 10 may be required to circulate large amounts of fresh air so as to sufficiently remove large amounts of stale air and $CO_2$ from the building. At night, however, the building 4 may be empty and the ventilator 10 may only be required to circulate a comparatively small amount of air. To enable the air processing system 2 to quickly change the operating conditions of the various components, the intelligent gateway 24 includes a plurality of operating condition profiles stored in a database (e.g., an SQL database) within the system storage of the intelligent gateway 24. For example, the intelligent gateway 24 may include profiles that enable the air processing system to operate in an "Air Flow Mode," a "Boost Mode," an "Unoccupied Mode," a "Free Cooling Mode," or an "Air Quality Mode." When operating in a given mode, the intelligent gateway 24 may be configured to switch to a different mode based on several different circumstances. For example, the intelligent gateway 24 may include a clock used to synchronize the internal clocks of the various air processing system components. When the clock reaches a certain time, the intelligent gateway 24 may be configured to switch the air processing system into a different mode. The intelligent gateway 24 may also be configured to switch the operating mode of the system based on a signal or instruction received from a user or technician connected to the intelligent gateway or when a sensor 36 coupled to the intelligent gateway 24 detects a change (e.g., an occupancy sensor determines that the building 4 is empty).

To monitor and control the intelligent gateway 24, a technician or authorized user may establish a connection between the intelligent gateway 24 and a personal electronic device 38 (e.g., a smart phone or a laptop). In the embodiment shown in FIG. 2, a wireless connection (e.g., a Wi-Fi or Bluetooth connection) is established to connect the device 38 to the intelligent gateway 24. In other embodiments, the personal electronic device may be connected to the intelligent gateway 24 with a wired connection 26 (e.g., an Ethernet connection). When connected, the personal electronic device 38 is capable of receiving and viewing various data and information related to the operation of the air processing system 2. For example, the personal electronic device 38 may receive sensor data from each of the sensors 36, the operating conditions of the various ventilators 10 and heating/cooling assemblies 12, the current operating mode and operating conditions profile the air processing system 2 is currently operating in, and any errors or issues detected by the intelligent gateway 24 (e.g., a filter replacement notification or an error indicating that a components is not functioning properly). The personal electronic device 38 may also be capable of issuing instructions or sending signals to the intelligent gateway 24 via the wireless connection 34 so as to control or make changes to the operating conditions of the air processing system 2. For example, the intelligent gateway 24 may enable a connected technician to switch the air processing system into a different operating mode via the wireless connection 34, change the operating conditions of one of the components of the air processing system 2 to adjust the temperature, humidity, and/or composition of the air within the building 4, and even program a new operating conditions profile to enable the air processing system to operate in a new mode.

However, establishing a wireless connection 34 (or a wired connection 26) between a personal electronic device 38 and the intelligent gateway 24 may only be possible when the personal electronic device is in close proximity to the intelligent gateway 24. To enable remote monitoring of the air processing system 2, the intelligent gateway 24 may be connected to a cloud computing server 44. In the embodiment shown in FIG. 2, the intelligent gateway 24 includes an LTE antenna 40 and is configured to establish an LTE connection 42 with the cloud computing server 44 to enable remote access to the intelligent gateway 24. In another embodiment, the intelligent gateway 24 may be connected to the cloud computing server 44 using a wired connection 26.

The cloud computing server 44 is configured to receive sensor data from each of the sensors 36, the operating conditions of the various ventilators 10 and heating/cooling assemblies 12, the current operating mode and operating conditions profile the air processing system 2 is currently operating in, and any errors or issues detected by the intelligent gateway 24. The cloud computing server 44 includes a database configured to store all of the received information. Furthermore, the server 44 is configured to analyze and sort the data in order to generate reports regarding issues relating to performance, cost, and health of the various components (e.g., ventilators 10 and heating/cooling assemblies 12) as well as of the entire air processing system 2. After generating the reports, the cloud computing server 44 is configured to send them to technicians and various interested users via Email. The cloud computing server 44 may also be configured to send alerts to the technicians and users via Email or via SMS text messages when an issue is detected. The cloud computing server 44 may be accessible to a technician or user via a web interface, where each authorized user accesses the server 44 using a personalized username and password. Once logged in, the cloud computing server 44 displays a dashboard that includes the current operating status, historical operating data, charts and diagrams of the air processing system 2, alerts and notifications, cost and energy-saving tips and recommendations, and health and efficiency estimates of the various air processing system 2 components. The dashboard may also include tools to enable remote activation of individual components or switching between operating modes.

Figure 3:
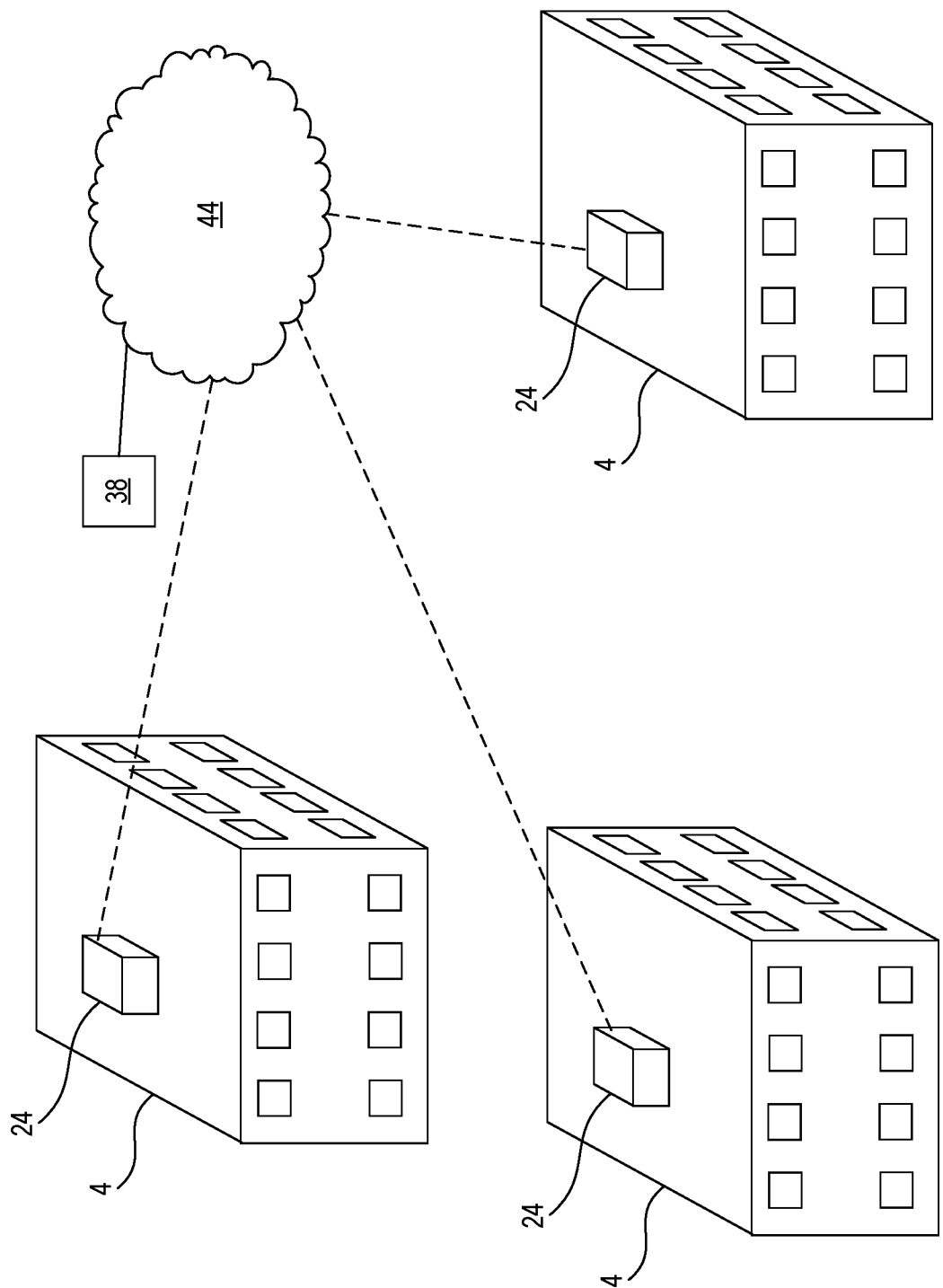
FIG. 3 is a diagram showing a network of buildings that each have an air processing system configured in accordance with aspects of the disclosure.

The cloud computing server 44 may also be capable of connecting to and communicating with multiple intelligent gateways 24. FIG. 3 shows a diagram of three buildings 4 that each have an intelligent gateway 24 configured to monitor and control the corresponding air processing systems that regulate the air quality and temperature of the air within the buildings 4. The cloud computing server 44 is connected to each of the three intelligent gateways 24 and is capable of sorting and independently analyzing the data and air processing systems from each building 4. When a user or technician accesses the cloud computing server 44 using the personal electronic device 38, the dashboard displayed by the server 44 separates the data and information relating to the individual air processing systems so that the performance of the individual systems may be independently monitored. The cloud computing server 44 may display the three buildings 4 on an interactive map that enables a user or technician to click on the individual buildings 4 and quickly see the individualized information. As such, the cloud computing server 44 allows for the simultaneous monitoring and controlling of the air processing systems for multiple buildings 4.

FIG. 1 and the discussion herein provide a brief, general description of a suitable computing environment in which the intelligent gateway of an air processing system, implementing an indicator network can be supported and implemented. Although not required, aspects of the system or server (which may include the system) are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the devices may include network communication components that enable the devices to communicate with remote servers or other portable electronic devices by transmitting and receiving wireless signals using a licensed, semi-licensed, or unlicensed spectrum over communications network, such as network 104 In some cases, the telecommunication network 104 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Figure 4:
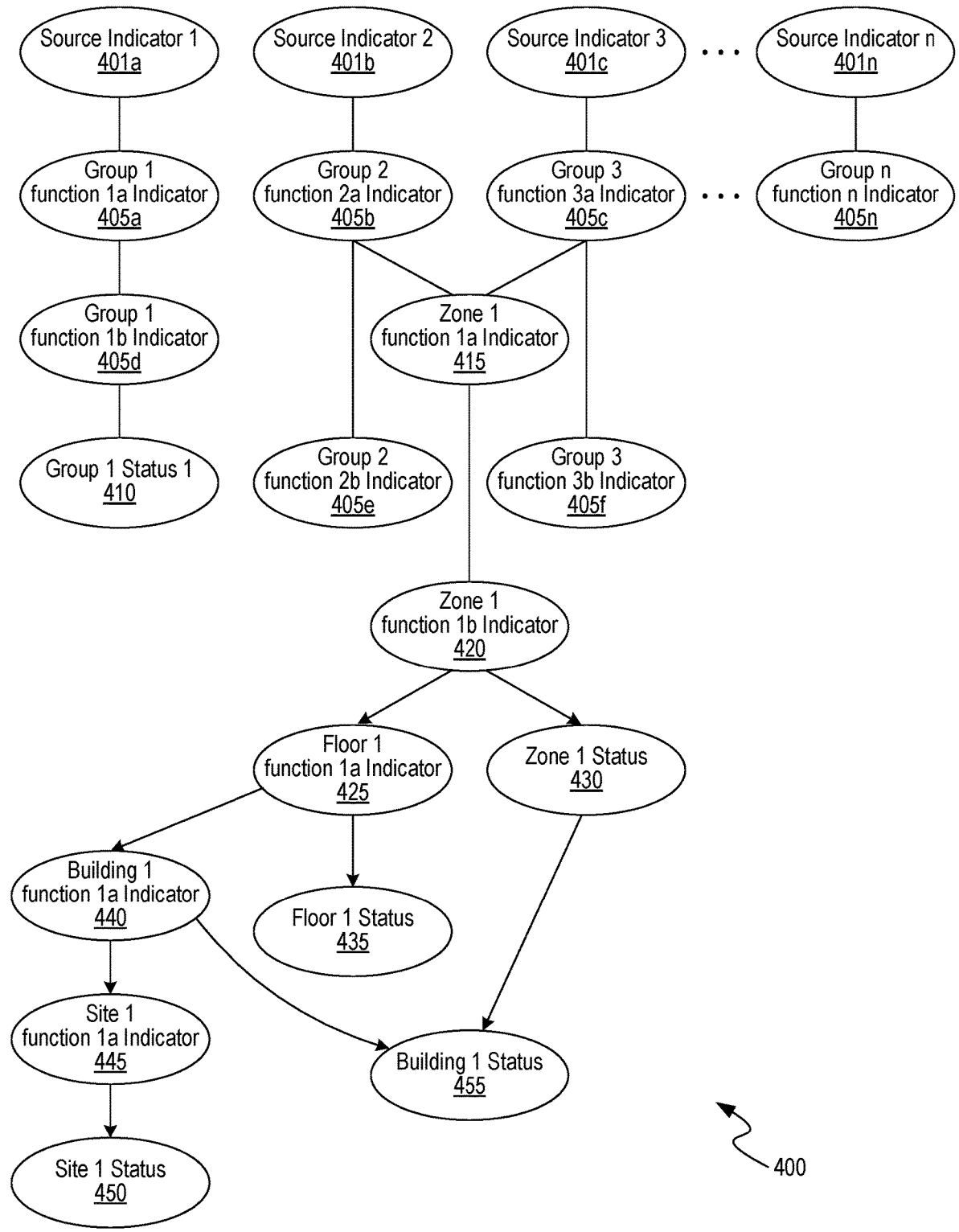
FIG. 4 is a diagram showing a hierarchical structure in which indicators are arranged in accordance with some aspects of the disclosure.

FIG. 4 is a diagram showing a hierarchical structure/indicator network in which indicators are arranged in accordance with some aspects of the disclosure. The nodes at the top of the hierarchical structure (e.g., tree or graph) 400, which can be the leaves of the network tree, are called 'source indicators' or simply 'sources' 401a, 401b, 401c, ..., 401n. A source indicator can contribute to one or more parent nodes/group function indicator nodes/container nodes (e.g., 405a, 405b, 405c, ..., 405n). Group functions can represent physical metrics or derived metrics (e.g., quantitative or qualitative results based on (or derived from) physical metrics). Examples of physical metric group functions include, but are not limited to carbon dioxide, temperature, humidity, volatile organic compounds, particulate concentration, power usage, ion concentration, occupancy, pressure (duct and refrigerant), air flow, and machine modes such as running/standby, heating/cooling, ventilation mode, and economy mode. Examples of derived metrics include, but are not limited to, efficiency, health, comfort, saturation point, leak detection, superheat, and subcooling. Comfort is a good example of a derived metric. Thermal comfort is a perceptual sensation which depends on many factors including air temperature, surface temperature, humidity, and airflow. These metrics interact in a generally predictable, but non-linear way. For example, with greater airflow, a higher temperature can be tolerated. Similarly, with lower humidity a higher temperature can be tolerated. By measuring several metrics and employing equations and tables based on guidelines such as ASHRAE Standard 55, a measure of thermal comfort can be derived and reported as a metric. Each parent node can further contribute to its own set of parent nodes. For example, group function indicator node 405b contributes to another group function node labelled zone1function1a indicator 415, which further contributes to indicator 420, 425, 440, 445, and so on. An example hierarchy utilizes the following group function indicator levels: zone, floor, building, site, state, geographic region (e.g., Northeast US, Northwest US, etc.), country, and so on. Sets of indicators can ultimately contribute to various hierarchical level statuses, such as group function status 410, zone status 430, floor status 435, building status 455, and site status 450. Each indicator is associated with an alert level, a value, and a message. The alert level can represent a severity of an associated alert, such as information, warning, critical, life-safety, and so on. The alert level can be represented internally as integers (e.g., 1, 2, 3, 4, and so on), and externally (e.g., to a user) as colors (e.g., green, yellow, red, purple, and so on). An alert level usually has associated text, called a message, for example 'Zone Temperature Normal' or 'Building Humidity Critical'. Internally, the message can be stored as an integer code which can be internationalized just-in-time by a presentation layer. For nodes which represent sensor values or aggregations of sensor values, the 'value' attribute holds that value. The value can be a typeless object, so it can be integer, float, string, boolean, and so on.

Source indicators can be bound to one or more physical or virtual sensor whose value can change over time. Examples of sensors include, but are not limited to those that measure temperature, humidity, occupancy, carbon dioxide, carbon monoxide, volatile organic compound, ion concentration, particulate concentration, pressure, flow rate, RPM, and so on. When a sensor value changes, an Update Indicator process (discussed below in reference to FIGS. 5A-5B) changes the value of the source node bound to that sensor. This change in source value causes all nodes to which the source contributes to recalculate their values, levels, and messages, and this process repeats for the entire network, following the contribution lines. In some implementations, level, message (code), and how to derive the value for a group function are specified in the specification data structure.

The nodes which aren't source nodes are created because of a group function definition. The group function definition determines how nodes in the indicator network are related to one another. The entire set of group function definitions defines the types of containers and their relative locations in the network hierarchy. For example, the fact that there is an container called a 'ZONE' is because a group function definition contained 'ZONE' as an element in the list of containers where the group function can be instantiated. Group function definitions also declare the parameters to the group function. Input parameters are values which control how the status information from contributing indicators is processed (e.g., alert thresholds). Output parameters define metrics which other processes can change and which may be coordinated by the indicator network. An example of this is when the target temperature of an air conditioner in a ZONE is changed, and the target temperatures of all other air conditioners in the ZONE must be set to the same value. This coordination is critical to harmonize equipment which shares a work load. Finally, the group function definition defines the alert conditions which can be generated by the group function at each container it can be instantiated within.

The relationships between source indicators and parent indicators can be specified in a specification data structure. The specification data structure can be maintained in various formats, such as a markup language (e.g., YAML, XML, etc.), data table, etc. For example, a specification file maintained in YAML format comprises the following information: group function definitions, how each group function contributes to each hierarchical/container level, and how each group function instantiated in a particular container will behave (e.g., how it is calculated, what alerts it can emit, and so on). The specification data structure can define custom functions to be used to compute values of group functions. Examples of custom functions include, but are not limited to sum, average, mean, median, mode, max, min and so on. The custom calculation function can be of arbitrary complexity. One example of a custom input calculation function might be to 'mask' the reading from a physical sensor in particular machine modes in which the sensor may yield false values. The false values might in turn trigger alert conditions which would otherwise have to be suppressed. The indicator network custom input function provides an elegant solution to this and many other situations frequently encountered in control and monitoring systems. Table 1 provides an example snippet from a specification data structure.

TABLE 1

```
group_functions:
  name: CO2        # The 'name' of a group function identifies it. This string becomes part of the node name, when concatenated with its container ID (e.g. ZONE1.CO2).
  category: CAT_HEALTH    # The 'category' key is used during event/alert/notification generation to classify the object. CO2 affects health.
  input_parameters:       # a list of parameters whose values come from a parameter database (or may be constants), and which contribute to the state calculation for a node.
    high_threshold:       # These thresholds define PPM levels at which CO2 is considered to be out of range. They are used below in the 'alerts' definition.
      Unit: PARTS_PER_MILLION
      data_type: FLOAT
      default: 1000
    critical_high_threshold:
      Unit: PARTS_PER_MILLION
      data_type: FLOAT
      default: 2000
    life_safety_threshold:
      unit: PARTS_PER_MILLION
      data_type: FLOAT
      default: 4000
  output_parameters:
    SIMPLE_GF_PARM_NAME:
      unit: PARTS_PER_MILLION
      data_type: FLOAT
  result:                 # The result of the any calculation function for this group function is defined here
    unit: PARTS_PER_MILLION
    data_type: FLOAT
  Containers :            # Define the containers and rules for each container this group function can be instantiated into
    ZONE:
      feeds:              # Define the connections radiating FROM a node, i. e., which indicators the group function instantiated into this container will affect
        HEALTH            # Note the lack of a prefix. This is a shortcut for 'this zone's HEALTH indicator'.
      input_calc_function:    # May specify the name of a Python routine to call to order to calculate the zone's CO2 based on contributing sensors.
      output_calc_function:   # May specify the name of a Python routine which coordinates a control signal to all equipment in the zone.
      alerts :            # Define the list of out-of-range events (alerts) which may be emitted from the group function instantiated in this container (the zone)
        name: ZONE_CO2_NORMAL   # Identifier of the alert condition. Even when a group function is in it's nominal state, an alert is issued that it's in this 'good' state.
        Severity: SEVERITY_INFO # Severity level is an arbitrary identifier which may change system to system, In our implementation, we have INFO, WARNING, CRITICAL, and LIFE-
                                  _SAFETY
        value:          # inputs to the calculation fonction can be constants, defined in this file, or parameters from on external database
          type: constant
          value: 0
        name: ZONE_CO2_HIGH
        Severity: SEVERITY_WARN
        type: parameter
          name: high_threshold    # this is the name of the group function parameter in the database table which holds all group function parameters
        name: ZONE_CO2_CRITICAL
        severity: SEVERITY_CRIT
        value:
          Type: parameter
          name: critical_high_threshold
        name: ZONE_CO2_LIFE_SAFETY
        severity: SEVERITY_LIFE_SAFETY
        portfolio: true
        value:
          type: parameter
          name: life_safety_threshold
```

TABLE 1-continued

```
Device:         # Device
include devices: [HRV, ERV] # if some devices have CO2 sensors but others don't, the list of devices this group function can be instantiated within can be provided here.
feeds :
   HEALTH
   ZONE.CO2     # Note the prefix. This says that when a Deviceregisters a CO2 sensor, and the device is in a zone, create a zone CO2 indicator as well.
                # This will in turn creare the zone HEALTH indicator; see above in the ZONE. feeds spec.
alerts:
   name: DEVICE_CO2_NORMAL
   severity: SEVERITY_INFO
   value:
      type: constant
      value: NEG_INF
   name: DEVICE_CO2_HIGH
   severity: SEVERITY_WARN
   value:
      type: parameter
      name: high threshold
   name: DEVICE_CO2_CRITICAL
   severity: SEVERITY_CRIT
   value:
      type: parameter
      name: critical_high_threshold
   name: DEVICE_CO2_LIFE_SAFETY
   severity: SEVERITY_LIFE_SAFETY
   portfolio: true    # Marks an indicator as 'included in the very top network view'.
   value:
      type: parameter
      name: life_safety_threshold
```

Figure 5A:
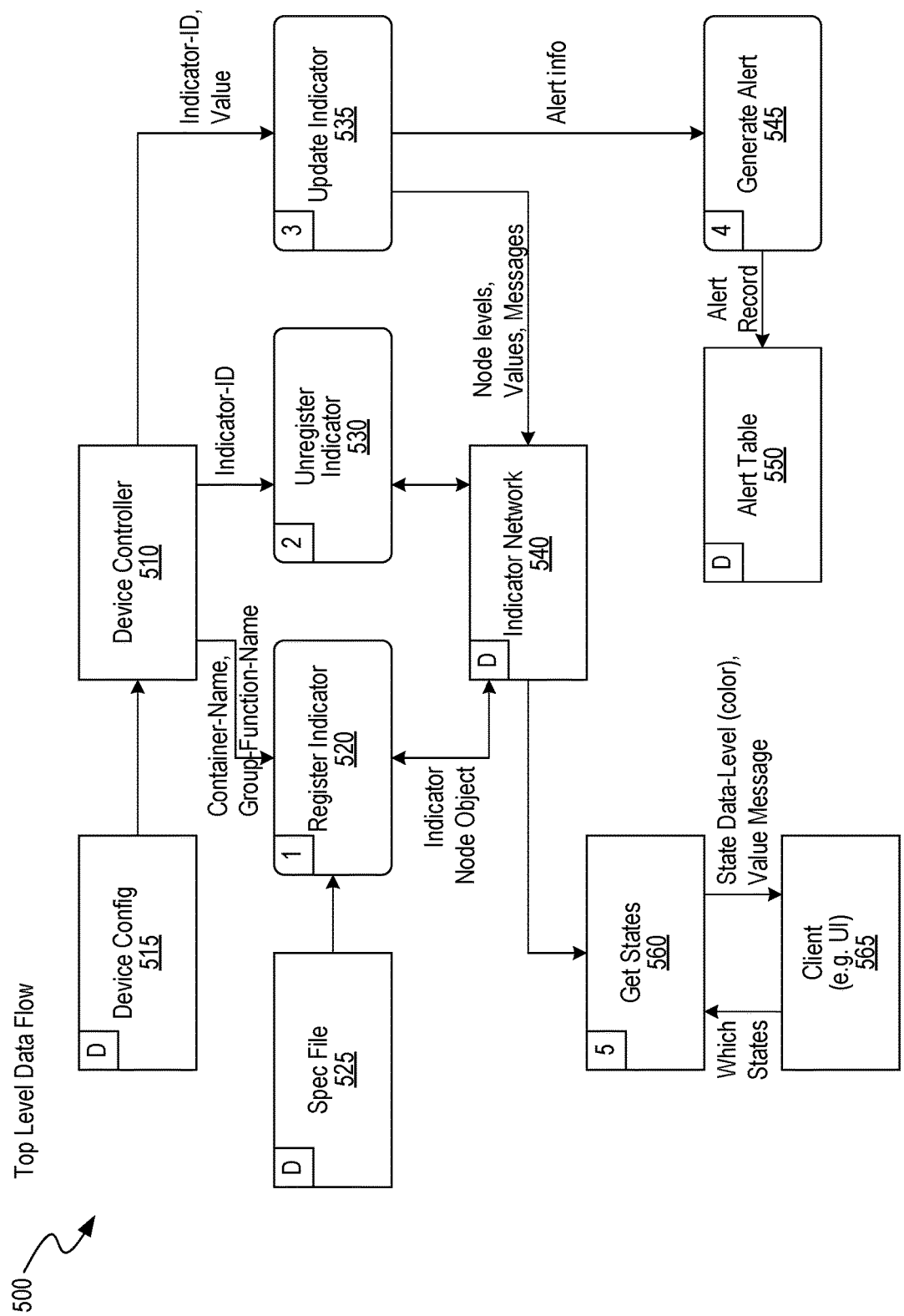
FIGS. 5A-5C are data flow diagrams illustrating processes performed in accordance with some aspects of the disclosure.
Figure 5B:
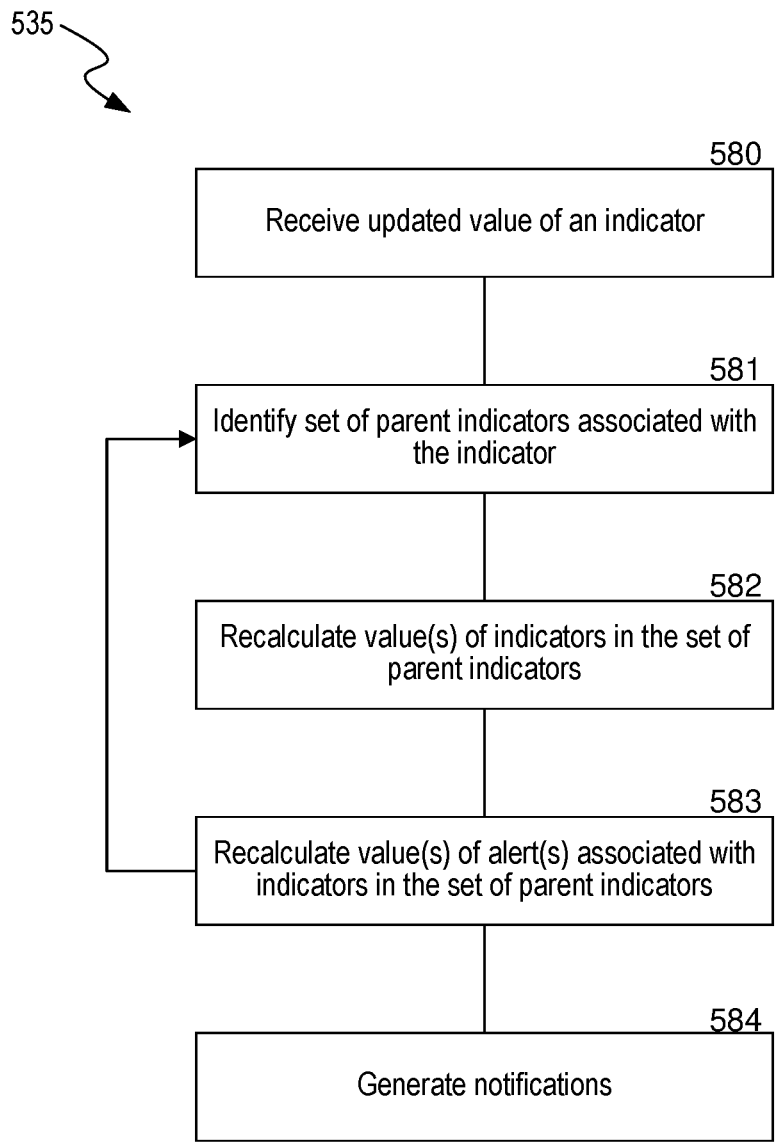

FIGS. 5A-5B are data flow diagrams illustrating processes performed in accordance with some aspects of the disclosure. FIG. 5A illustrates a data flow 500 performed by an intelligent gateway, of an air processing system, implementing an indicator network. A device controller entity 510 is responsible for loading, communicating with, and unloading devices from the air processing system. The device controller 510 can access a device configuration data structure 515, which maintains records that describes devices at a monitored location (e.g., site). The device controller 510 loads the correct drivers for one or more devices specified in the device configuration data structure 515. When a device is loaded, its configuration (e.g., in the specification data structure 525) specifies which sensors it contains and which group functions those sensors are bound to. For example, when a device contains a $CO_2$ sensor, that sensor is bound to the $CO_2$ group function specified in specification data structure 525. The device controller 510 can access a register indicator process 520 to register each new indicator. For example, the device controller 510 can make an API call to the register indicator process 520 and pass the container name (in this case, the equipment name), and the group function name (in our example, '$CO_2$'). The register indicator process 520, using the specification data structure 525, creates an indicator to represent the sensor and instantiates that indicator into the device container of the calling device. This is a recursive call which can create many indicators as specified by the 'feeds' and 'feeds_first_of' keys in the specification data structure 525. The register indicator process 520 returns the created indicator identifier to the device controller 510, which allows it to later delete or update the created indicator. The intelligent gateway can maintain an indicator network data structure 540. In some implementations, the indicator network data structure 540 is an in-memory data structure that consists of a set of nodes (indicators) which contain lists of pointers to other indicators, thus forming the directed graph (e.g., as discussed above in reference to FIG. 4) on which the algorithms operate.

When a device is unloaded, the device controller 510 invokes an unregister indicator process 530 (e.g., by invoking an API) and passes it the indicator identifier to delete. This is a recursive call, and may delete many indicators from the indicator network data structure 540. For example, if a temperature sensor indicator is being removed, and that indicator is the sole contributor to the parent zone temperature indicator, the zone temperature indicator will itself be deleted. If the deleted zone temperature indicator is the sole contributor to the parent floor temperature indicator, that indicator will be deleted. This continues all the way up the hierarchy (discussed above, for example, in reference to FIG. 4).

When a sensor value changes, the device controller 510 invokes an update indicator process 535 (e.g., by invoking an API) and passes it the indicator ID to update and its new value. Using the indicator network data structure 540, the revised/updated value is 'pushed' through the network. When the value of an indicator changes, all of the indicators to which is contributes (its 'parent indicators') are signaled to recalculate themselves, which allows them to consider the new value and generate their own new value. In turn, each parent indicator which takes on a new value will signal each of its parents to recalculate themselves. As these changes move through the network, the semantics of the data can change depending on the affected indicators' input calculation functions and alert specifications specified in the specification data structure 525. When a change propagates through the indicator network data structure 540, it can affect indicators which have alert specifications. If so, the new value is compared against the defined alert thresholds, and if necessary an alert is emitted via a generate alert process 545. The generate alert process 545 can take the alert information generated by the update indicator process 535 and generate an alert record (e.g., in an alert table 550). In some implementations, when a client, such as a user interface 565 needs to know information related to an indicator (e.g., the color of a badge or other UI element), it can use an API call to a get states process 560, passing the identifiers for the set of states it needs. These states can be pre-calculated by the update indicator process 565 and stored in the indicator network data structure 540 for quick retrieval. For each requested status, which corresponds to a single indicator, the level, message, and value can be returned.

FIG. 5B illustrates an examples update indicator process 535 to manage information flow when one or more indicator values are updated. At act 580, process 535 receives an updated value of an indicator (e.g., a source indicator associated with a metric). An indicator is associated with a metric (e.g., temperature, humidity, CO2 for HVAC applications; battery life, memory remaining, etc. for IoT devices applications; drone location, cargo weight, etc. for drone fleet applications, and so on). The metrics can be selected from a set of metric comprising metrics that represent a physical quantity (e.g., temperature) and metrics representing a derived quantity (e.g., comfort). At act 581, process 535 identifies a set of parent indicators associated with the indicator whose value was updated. At act 582, process 535 recalculates values of the indicators in the set of parent indicators (as discussed above). After recalculating the values of the parent indicators, process 535, at act 583, recalculates values of alerts associated with each of the parent indicators. For example, a recalculated value of a parent indicator may have moved it from a safe threshold zone to a critical threshold zone. Process 535 repeats acts 581-583 for each impacted indicator in the indicator network. Once all indicators are processed, at act 584, process 535 can generate notifications (e.g., via email, text alerts, UI alerts, and so on).

Figure 5C:
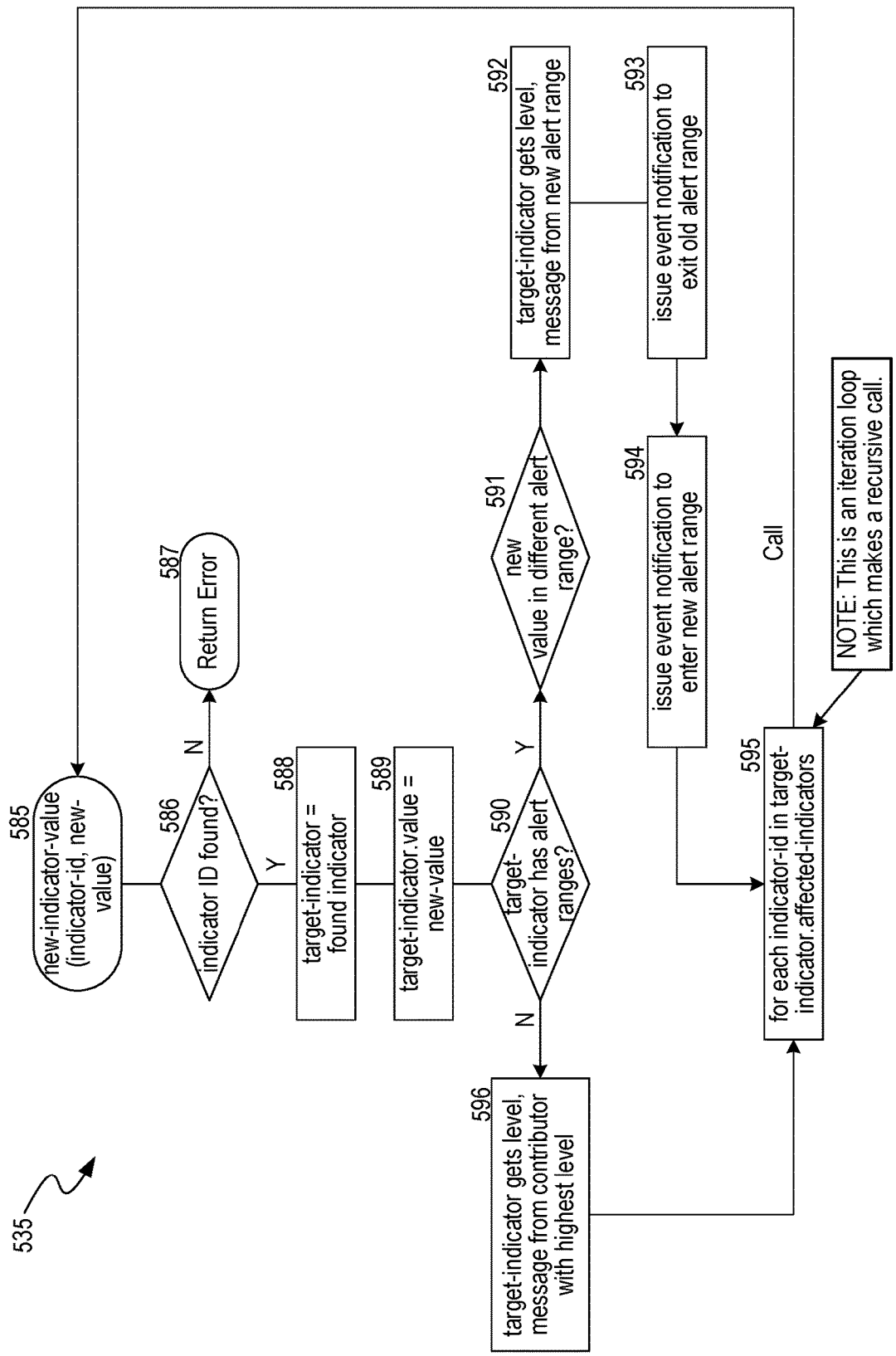

FIG. 5C illustrates an example update indicator process 535 performed by the device controller 510. At act 585, process 535 receives an updated value for an indicator. For example, the device controller 510 can invoke a new-indicator-value function by passing it an indicator identifier and a new value. At act 586, process 535 determines if the indicator identifier exists. When a matching indicator identifier is not found, at act 587, process 535 returns an error. When a matching indicator is found, process 535 proceeds to act 588 where it assigns the identified indicator as the target indicator. At act 589, process 535 assigns the target indicator value to be the received updated value. At act 590, process 535 determines whether the identified target indicator is associated with one or more alert ranges (e.g., by examining the specification data structure). When the target indicator is not associated with an alert range, at act 596, process 535 assigns to the target indicator a level and a message from the contributor indicator with the highest level. Each indicator contains a list of indicators which contribute directly to it. It is trivial and fast to iterate over this list to determine which contributing indicator has the highest alert level, and then to copy that alert level and message into the target indicator.

Figure 6A:
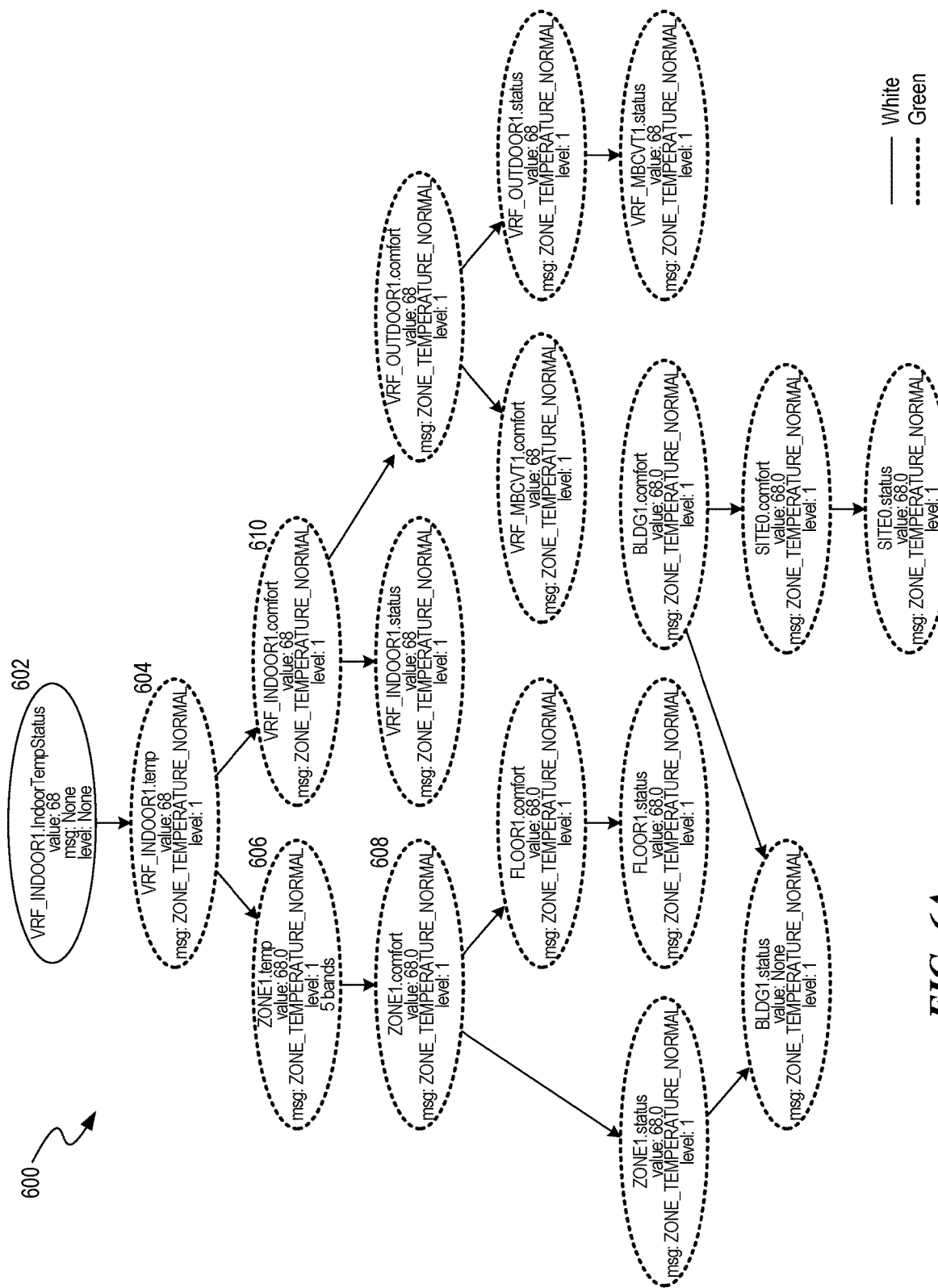
FIGS. 6A-6C are diagrams showing the flow of information through a hierarchical structure of indicators in accordance with some aspects of the disclosure.

When the target indicator is associated with an alert range, at act 591, process 535 determines whether the received updated value results in a different alert range associated with the target indicator. Based on the identified alert range, at act 592, process 535 assigns a level and/or message to the target indicator. At act 593, process 535 can issue an event notification to exit the old alert range for the indicator and at act 594, issue an event notification to enter the new alert range. At act 596, process 535 iterates through acts 585 through 596 for each indicator in a set of affected indicators. The set of affected indicators comprises parent indicators associated with the target indicator. Referring to FIGS. 5B and 6A, the intelligent gateway performs the following steps when the temperature status of an indoor unit changes:

a. An external process uses an API function to register a change in node 602 with the indicator network;

b. Node 602 contributes to node 604, so node 604 is notified to recalculate itself;

c. Node 604 recalculates itself. Since there is a single contributor (node 602), the value of node 602 is copied to node 604.

d. Node 604 contributes to node 606 and node 610. When node 604 recalculates itself and gets a new value, node 604 notifies nodes 606 and 610 to recalculate themselves.

e. Node 606 recalculates itself. Since there is a single contributor (node 604), the value of node 604 is copied to node 606.

f. Since node 606 contains alert specifications, the new value of node 606 is compared against the thresholds of the defined alerts. For the purposes of this example, assume that the initial value of node 606 was NULL and therefore did not match any of the defined alert thresholds. The new value of node 606, after it assumes the value of node 604, does match an alert threshold whose level is defined as 1, or Green. Note that the information (the new temperature value) may take on semantic meaning as it propagates through the network. In this example, because the new temperature value moved through a ZONE container (node 606), it took on the semantic of a Green ("OK") status because the ZONE container had alerts defined which allowed for that interpretation. The same information may be interpreted in different ways by different containers it moves through during its propagation.

g. The new alert level causes acts 592, 593, and 594 to execute. These acts notify external processes that the alert state has changed. These changes may be logged and/or elevated to user notifications, depending on system configuration.

h. Node 606 has a single contributor, node 604, which does not have alert definitions. In this case, the indicator network logic propagates the alert state and message logically downward (against the contribution arrow) to node 604. This is done so that user interface elements based on the alert state of the equipment container, node 604, can show the alert level associated with temperature sensors within the equipment, even though there are no configurable alert levels associated with the equipment node 604.

i. Since the value and alert level of node 606 have changed, the node to which node 606 contributes, node 608, is notified to recalculate itself.

These acts repeat for the network, following the contribution edges in the graph. Any time a node value or level changes, all of the nodes it contributes to are notified to recalculate themselves. If any of those nodes takes on a new value, further propagation is triggered until the new value reaches a node which does not contribute to any nodes. As discussed above, the processes and systems described herein can apply to various metrics management systems, such as network of drones (e.g., for delivery), computer network management, oil drilling/refineries, factory automation (SCADA), network of IoT devices, HVAC, and so on.

Figure 6B:
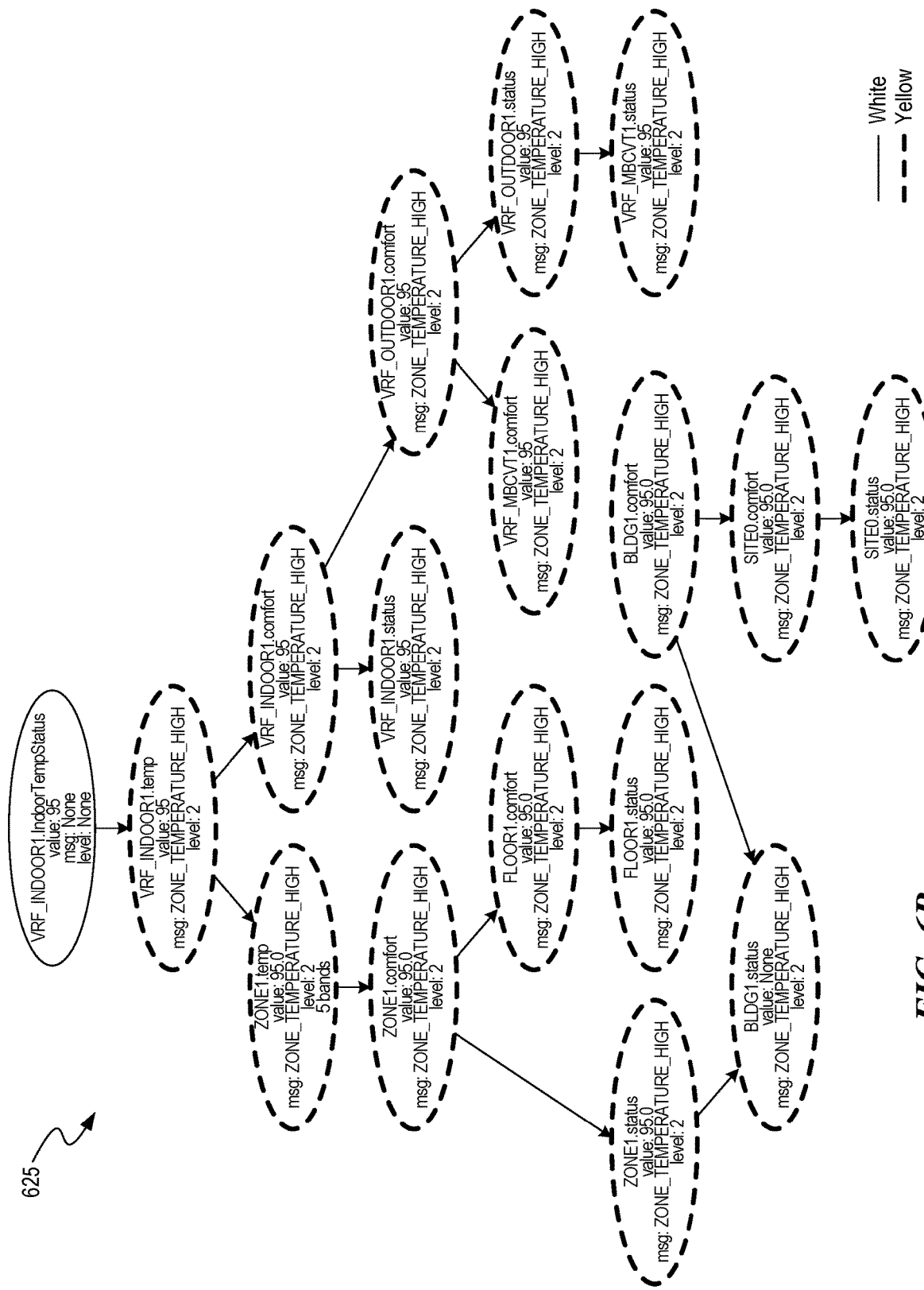
Figure 6C:
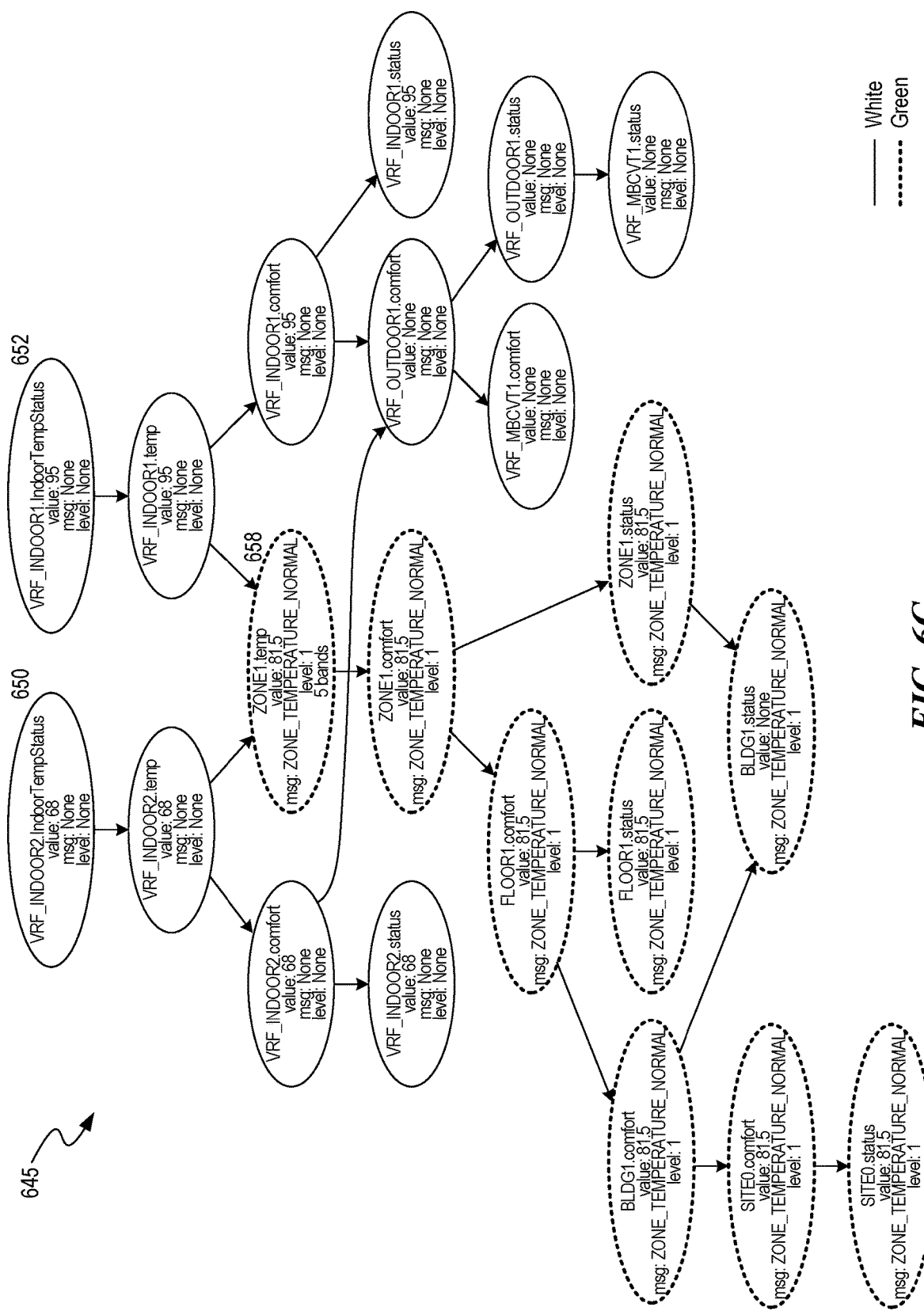

FIGS. 6A-6C are diagrams showing the flow of information through a hierarchical structure of indicators in accordance with some aspects of the disclosure. FIG. 6A illustrates a graph 600 comprising several indicator nodes. For instance, a single indicator was registered to create graph 600. That indicator 602, whose identifier is VRF_INDOOR1.IndoorTempStatus, can be seen at the top of the graph. When registered, it was bound to the group function TEMPERATURE, whose internal identifier is 'temp'. Since the registered indicator contributes to the TEMPERATURE group function, that group function indicator was created within the device, hence the next node down 604, VRF_INDOOR1.temp. A corresponding entry in the specification data structure can specify that when a TEMPERATURE group function is created within a device, it contributes to ('feeds') ZONE.TEMPERATURE, and COMFORT. Since the device is configured to reside in ZONE1, the ZONE1.TEMPERATURE indicator 606 and ZONE1.COMFORT indicator 608 were created, and also the VRF_INDOOR1.COMFORT indicator 610 was created. The ZONE1.TEMPERATURE indicator can be annotated with the text '5 bands'. This indicates that when a TEMPERATURE indicator is instantiated in a ZONE container, there are 5 alert states which that indicator can assume, as specified in the specification data structure. For TEMPERATURE, those states are: ZONE_TEMPERATURE_LOW_CRITICAL, ZONE_TEMPERATURE_LOW, ZONE_TEMPERATURE_NORMAL, ZONE_TEMPERATURE_HIGH, and ZONE_TEMPERATURE_HIGH_CRITICAL. Once the indicator 602 is registered to make graph 600, it can be assigned a value, using for example, a reading from a temperature sensor. In the example illustrated in FIG. 6A, indicator 602 is assigned a value of 68° F., which is in the normal range. This causes the ZONE.TEMPERATURE indicator 606 to take on an alert level 'Information,' which corresponds to the Green status color. Since the ZONE.TEMPERATURE indicator 606 has a single contributor, when the ZONE.TEMPERATURE indicator 606 took on the Info (Green) status, that status was propagated to the VRF_INDOOR1.TEMPERATURE indicator 604. This is called the 'down propagation' feature of the indicator network, and is a way of providing a useful status level to parts of the network which don't themselves normally take on a status color. Note that the term 'down propagation' refers to the flow of information toward the source indicators, against the contribution edge arrows, When the VRF_INDOOR1.TEMPERATURE indicator 604 took on the Info (Green) status, it requested that all of its parent indicators (the ones to which is contributes, which in the graph are the ones below it) should recalculate their statuses. Each of those indicators examines its contributing indicators to calculate its new status, which is then propagated generally downwards in the graph. This is why all of the indicators (except the top 'leaf' sensor indicator) show a Green status.

FIG. 6B illustrates a graph 625 is identical to the graph 600 illustrated in FIG. 6A, except that the registered indicator 602 was given a value of 95° F., which corresponds to the Warning (Yellow) status level. The threshold value for the alert level can be based on a parameter (e.g., labeled 'high_threshold'). The specification data structure can specify that the TEMPERATURE group function is associated with this parameter. The value of the parameter can be maintained in a dynamic manner and/or in a database or other similar means. For example, the values in the database table can be settable via API calls based on user input (e.g., via a user interface).

FIG. 6C illustrates a graph 645 where two indicators 650 and 652 are registered. They represent the temperature sensors from two Indoor Units ('IUs') which control the temperature for a single zone. Note that one of the IUs, VRF_INDOOR1, is reporting a temperature status of 95 degrees, while the other, VRF_INDOOR2, reports 68 degrees. When these temperatures contribute to the ZONE1.temperature indicator 658, a custom calculation can be used to determine the value of the group function indicator's 658 value. The custom calculation function can be specified in the specification data structure. In this way, custom calculation functions of arbitrary complexity can be used to alter the behavior of the indicator network. In the example illustrated in FIG. 6C, an average custom calculation function is used to compute the value of the group function indicator ZONE1.temperature 658. Because the inputs are averaged, the ZONE1.TEMPERATURE indicator 658 takes on a value of 81.5, which is still in the Info (Green) alert range. Note also that down propagation of the zone Info (Green) status does not propagate downward, because there are multiple contributors, and it cannot be assumed that all contributors are OK. This is why the Info (Green) status does not propagate throughout most of the graph. This is an implementation detail and may be altered without changing the claims made herein.

Figure 7A:
FIGS. 7A-7D are diagrams showing user interfaces to display relevant information in accordance with some aspects of the disclosure.
Figure 7B:
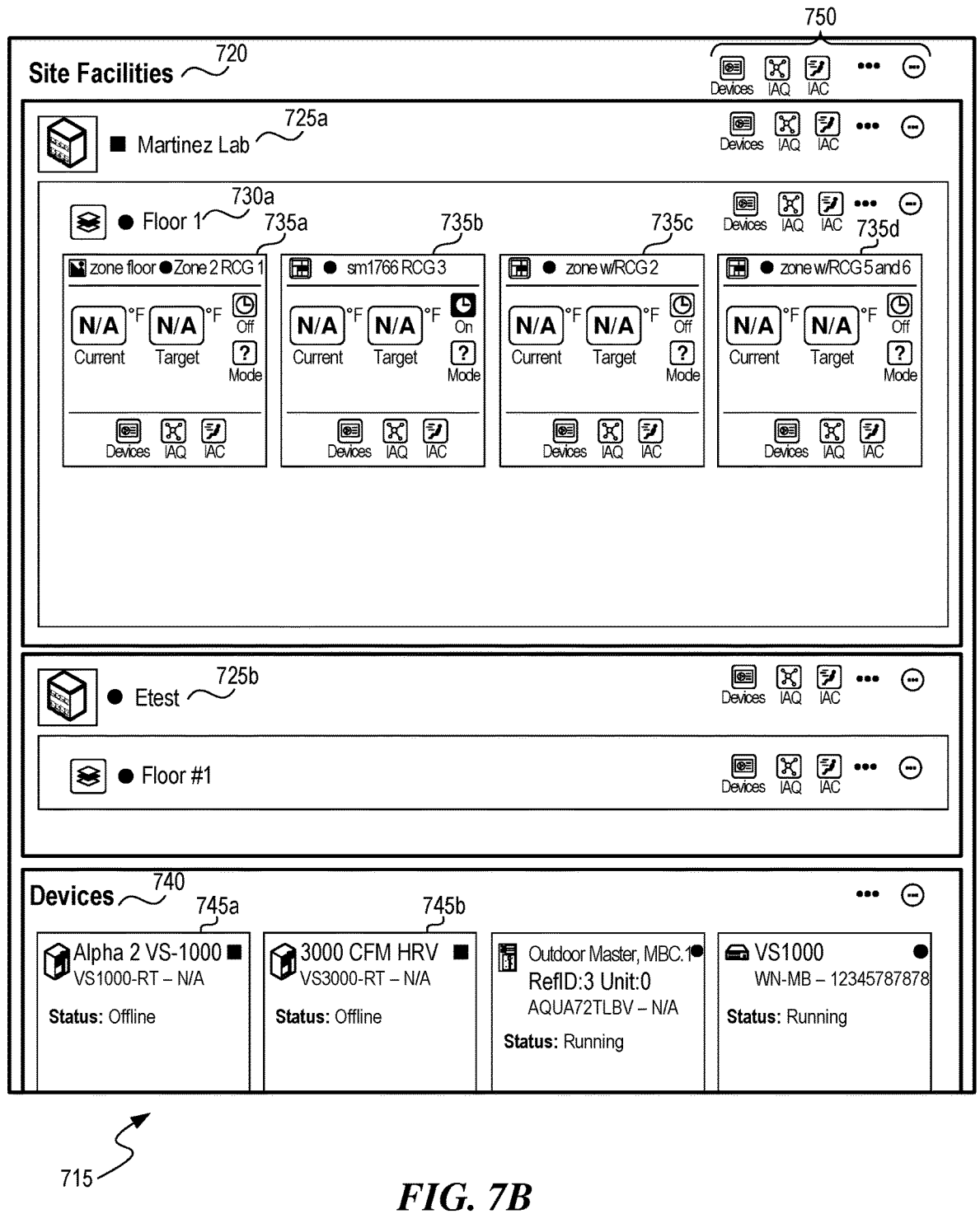
Figure 7C:
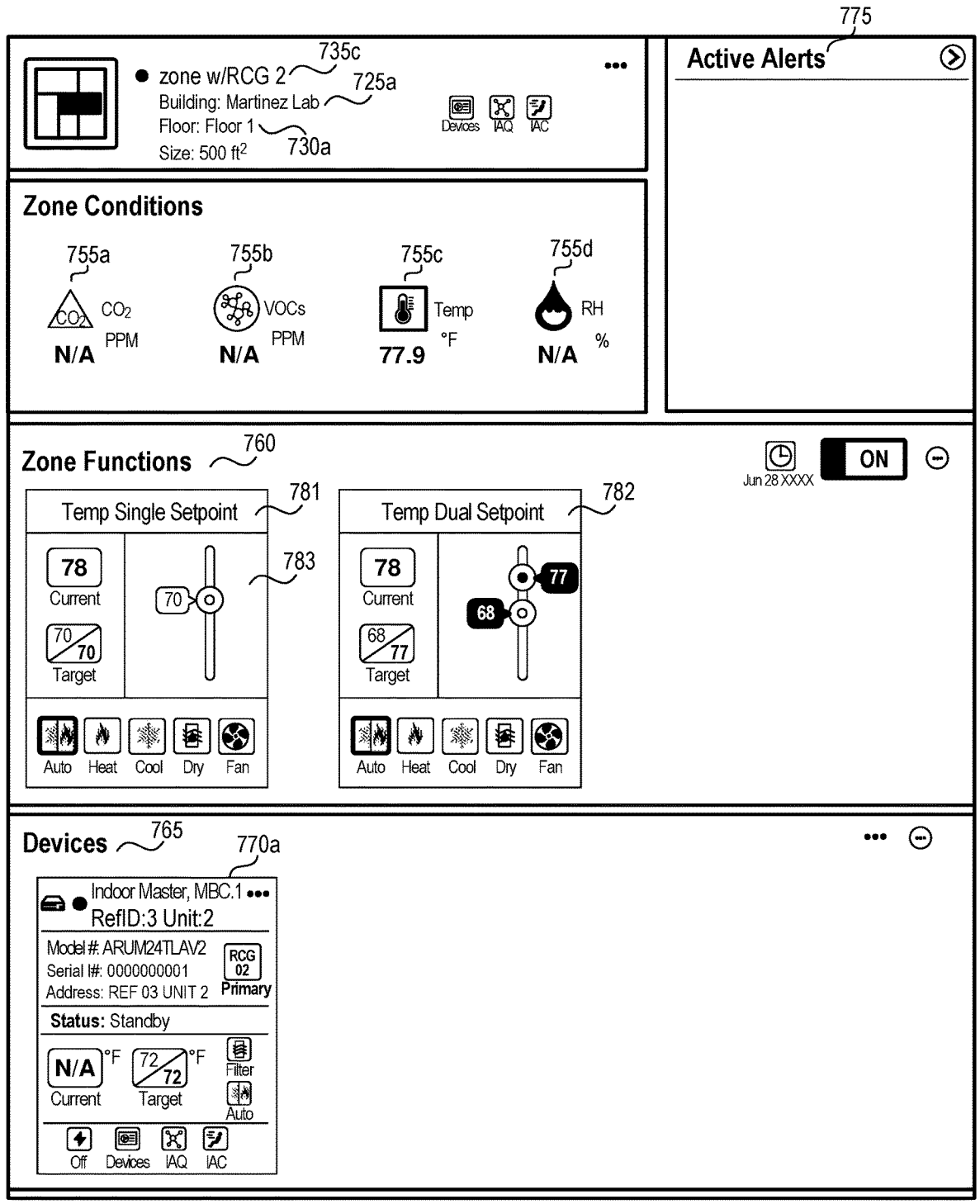

FIGS. 7A-7C are diagrams showing user interfaces to display relevant information in accordance with some aspects of the disclosure. FIG. 7A illustrates a user interface 700 that displays a portion of a map of a country (U.S.) with icons 705 and 710 corresponding to multiple sites at the indicated locations. A user can view information at a country level, and then select an icon (e.g., by clicking on icon 705) to view details associated with the summary icon. FIG. 7B illustrates a user interface 715 showing details at a site 720. Site 720 comprises various buildings 725a and 725b, and each building comprises one or more floors (e.g., 730a). Each floor can further comprise one or more zones 735a, 735b, 735c, and 735d. Each zone comprises one or more source indicators, such as sensors that measure temperature, carbon-dioxide levels, humidity, and so on. For each hierarchical level (e.g., site, building, floor, zone, sensor, etc.), the user interface 715 can display options 750 that enable a user to quickly see the occupied, device, air quality, and air comfort alert statuses based on the color of the icons. User interface 715 can further display one or more devices 740 at a hierarchical level (e.g., site). For example user interface 715 displays devices 745a, 745b, and so on, and their associated information (e.g., device name, type, status, etc.) associated with site 720. User interface 715 enables a user to further select a hierarchical level to view more details associated with that level. For example, when a user selects an icon associated with zone 735c illustrated in FIG. 7B, the user is presented with a user interface 780 as shown in FIG. 7C. User interface 780 displays details of a zone 735c, such as zone conditions 755a, 755b, 755c, and 755d; zone function 760; and zone devices 765, such as device 770a. A zone function 760 can comprise one or more group functions, such as a single setpoint temperature group function 781 and a temperature dual setpoint group function 782. When a user changes the setpoint associated with the single setpoint temperature group function, for example via control 783, any devices in the zone which registered themselves into the indicator network with the TEMPERATURE group function would be coordinated to harmonize with the new setpoint. The status icons/badges 755a . . . d show the $CO_2$, VOC, temperature, and humidity values. In addition, user interface 780 can display any active alerts 775 associated with the zone 735c.

Figure 7D:
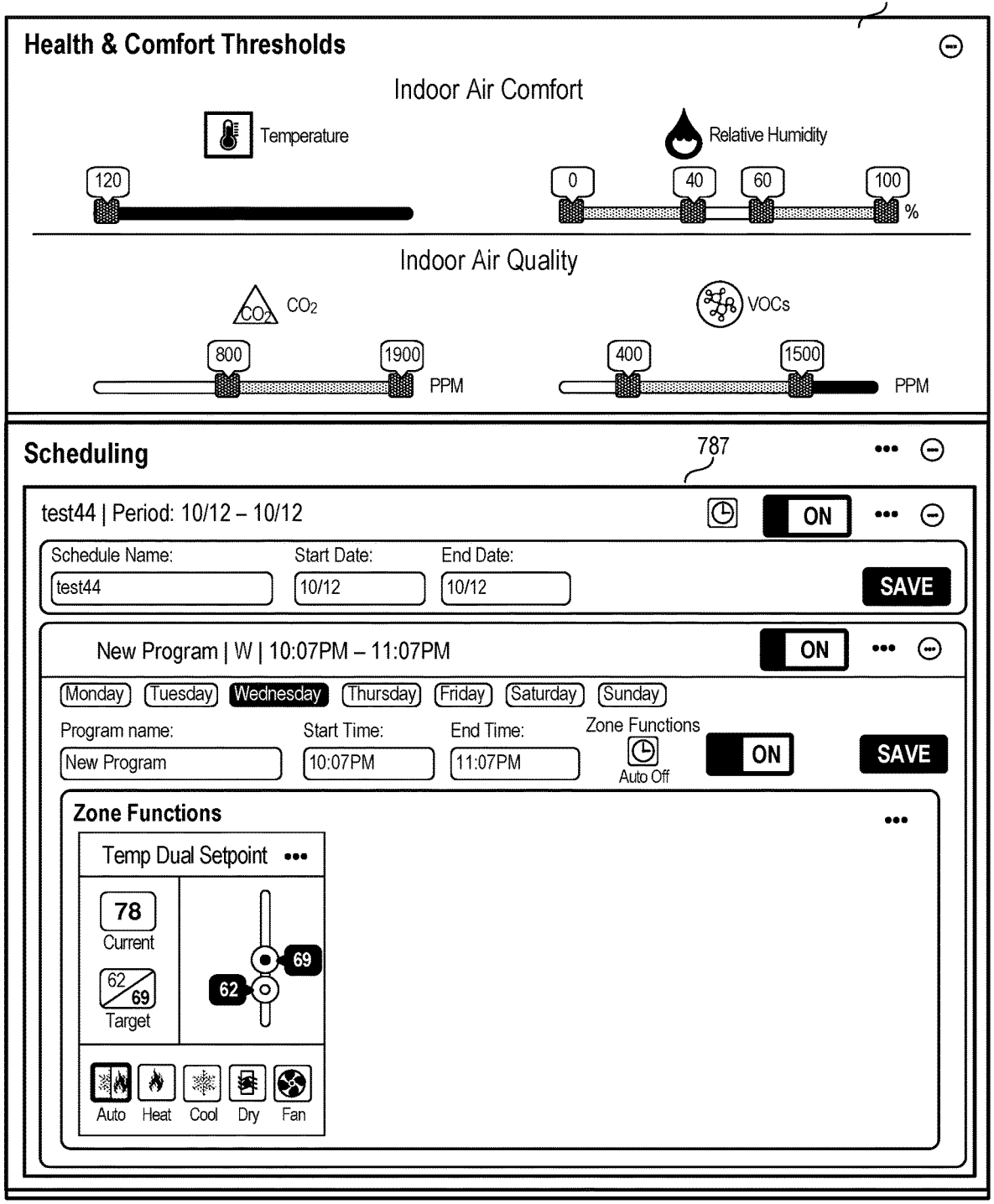

FIG. 7D illustrates a user interface that enables a user to alter one or more target indicator values. When a zone function value is updated (for example, a user selects a zone function to set the target temperature of the devices in the zone), the intelligent gateway implementing the indicator network coordinates this action. The user interface enables a user to define various thresholds using one or more control 786, assign a schedule using control 787, and in other ways control the functioning of the HVAC system. For example, a user can select that for a particular zone, on a particular date/time range, to set the temperature to a value, or turn all equipment in the zone on or off, or put it into economy mode. The intelligent gateway can handle all such updates via the use of group functions controlled by the indicator network such that new equipment types can be added later, but the same scheduling configuration with control and coordinate that equipment in the same way.

Configuration Data Model

When an intelligent gateway is associated with one or more sites, configuration edits (e.g., changing a zone target temperature) are done at the intelligent gateway. One or more database associated with the intelligent gateway can record these changes. Those database changes are then transferred to a set of cloud servers to facilitate, for example, failover and disaster recovery. Site configuration data consists of a set of facts about a site which specify all of its characteristics. This set of facts can be stored in a database schema (also called a configuration database) (e.g., a PostgreSQL schema) consisting of one or more tables. An instance of this schema can exist on both the intelligent gateway and cloud server. When a site is in pre-install, all edit operations to the configuration database (e.g., through UI actions) are recorded in the cloud server database instance. When an intelligent gateway is associated with the site, the configuration information must be transferred from the cloud server database to the intelligent gateway database. Once an intelligent gateway is associated with a site, all configuration editing operations from the UI are recorded on the intelligent gateway database. As such, the cloud server(s) need to maintain an accurate and up-to-date image of the associated site(s). This transfer is called 'replication'. In some implementations, the replication task can use an extension module of PostgreSQL called 'pglogical'. A typical requirement of replication is that the table structure of the intelligent gateway and cloud server databases exactly match each other. If this requirement is not met at any point in time, replication is broken. It is therefore difficult to update the data model even with a single intelligent gateway connected (there isn't a way to simultaneously update both sides). With conventional systems, replication would have to be turned off, both sides updated, then replication turned back on. This is complicated and not practically feasible because whenever replication is turned on, the destination (cloud server) tables must be empty of all records pertaining to the source (intelligent gateway) site. If this is not true, replication collisions occur and replication is broken. To further complicate matters, since multiple intelligent gateways can be connected to the same cloud server, it becomes truly impractical to manage schema changes. The only way to make it work would be do turn off replication to all sites, upgrade the cloud server database to the new model, then upgrade every intelligent gateway to the new model, and finally turn replication back on to each site. This is not easy, efficient, or practical, and it does not scale well.

To solve these and other problems with conventional systems, a configuration data model system is disclosed. The configuration data model system uses a time series representation of the configuration data and only replicates the time series. In this manner, the configuration schema can be considered as a 'parallel' representation of the data, and the time series as the 'serial' representation of the same data—the set of time-ordered operations which, when applied to an empty configuration, result in a populated one. The parallel version can be serialized, and the serialized version can be deserialized again. In an intelligent gateway, the configuration can therefore be serialized to a single table. This single table is replicated to the cloud server(s), where it is deserialized back to the configuration schema. In some implementations a REST API can require the configuration schema to exist in the 'parallel' form, meaning the configuration tables with constraints actively enforce integrity. The configuration data model system does not impose a change on the API code. Instead, it only changes the method of transferring configuration changes between the intelligent gateway(s) and cloud server(s).

The configuration data model system can represent a database record (e.g., a row of a data table, such as a PostgreSQL table) as data object (e.g., a JSON object). The keys of the object can be the column names of the data table and the values can be the column values. Table 2 provides an example site configuration record represented as a JSON object.

TABLE 2

```
{
    "sbg_buildingid" : 1,
    "accepted_tos" : false,
    "tos_accepted" : null,
    "siteuuid" :
    "30b3c607-2e1c-11e8-96c4-9884e3068509",
    "area_units": "Square Feet",
    "temperature_scale" : "DegF",
    "auto_detect_time_zone" : false,
    "daylight_savings_time_end" : null,
    "state" : "pre-install",
    "svnms_roles" : null,
    "creation_timestamp" : null,
    "deletion_timestamp" : null,
    "hrv_auto_damper" : "OFF",
    "clientid" : "hvac@ventacity.com",
    "properties" : null,
    "vrf_hrv_coordination" : "OFF",
    "name" : "Ventacity - Martinez"
    "date_time_format" : "mm/dd/yyyy hh:mm:ss",
    "daylight_savings_time_start" ; null,
    "time_zone" : "US/Pacific",
    "air_flow_scale" : "CFM",
    "sbg_latitude" : null,
    "accountid" : "matt@ventacity.com",
    "sbg_longitude" : null
}
```

In some implementations, the configuration data model system can maintain a single table to store data for the entire set of configuration tables. This single table can then be replicated, and all configuration data and changes to that data can be made available at the replication destination (cloud server). Configuration data in the schema view is a 'snap shot' of the configuration—it is the sum of all of the create, delete, and update operations which have happened to the tables since their creation. There is another way to view this data, namely as the series of steps required to produce the end product. Storing the data as a series of facts has several advantages. The fact store doubles as an audit log. As a time series, each change to the configuration will have a time stamp. The initiator of the change can be stored with each record, so that it is clear who changed what, and when. A configuration can be rolled back (or forward) to any point in time because all of the steps are present in the fact store. The schema can change over time (meaning, the names and types of facts stored about the configuration can change as the code evolves), but no data is ever lost. The single configuration replication table can also serve as this fact store.

When the growth of this table on the intelligent gateway over time is a concern, the configuration data model system can reduce the facts to optimize space. The intelligent gateway can invoke an API (e.g., a REST API) to identify the latest replicated record. In some implementations, the configuration data model system can combine fact records which target the same row of the same table. For example, the temperature of Zone 1 may have been changed 50 times, and so there will be 50 facts recording those changes. All of those facts can be replaced by a single one with just the latest set temperature. If this example is followed for every table in the schema, only a single fact for each record of each table will end up in the fact store of the intelligent gateway, and this is the minimum set of records required to hold the configuration. In other implementations, the configuration data model system can empty fact store on the intelligent gateway and re-export the configuration into the fact store. This will result in a new, minimal set of configuration facts being replicated to cloud server, which is harmless. It is likely that configuration data for a site will never grow objectionably large on the cloud server side, because the frequency of configuration changes isn't very great. However, when configuration changes need to flow into a data lake, the time series is designed so that a unique string key can be formed for each change, which makes it data-lake ready.

Figure 8:
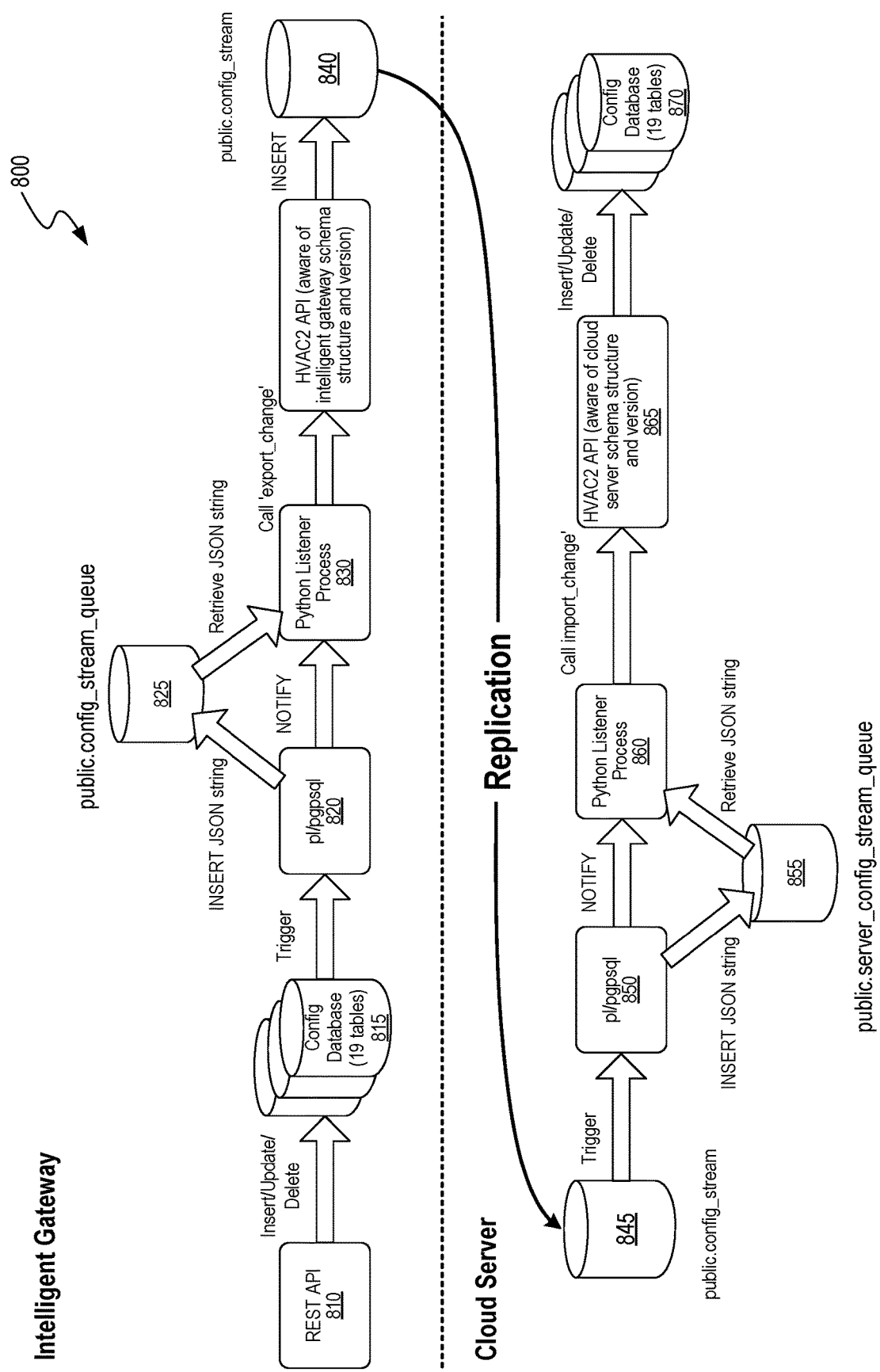
FIG. 8 is a data flow diagram illustrating a process performed by a configuration data model system in accordance with some aspects of the disclosure.

FIG. 8 is a data flow diagram illustrating a process 800 performed by a configuration data model system in accordance with some aspects of the disclosure.

Transferring Configuration Changes from Many Tables to One (Intelligent Gateway Side)

When any of the configuration tables 815 associated with the intelligent gateway are changed (i.e., a REST API call 810 is made which alters the configuration and thus changes the tables), that change is captured and recorded in the single replication table. This can be done with a trigger procedure 820 and a listener process 830 (e.g., a listener process implemented using Python). In some implementations, the same trigger procedure is installed on all of the configuration tables of the intelligent gateway such that when any insert, update, or delete operation occurs on any configuration table, the trigger procedure is executed. When the trigger executes, it creates a data object (e.g., JSON) string with all of the change data and inserts that into a queue table 825. Using NOTIFY, it then sends a notification to the listener process 830 informing that a change has occurred in the database 815 and to look in the queue table 825 for the change. The listener process 830 can then export the change to the single replication table 840.

The single replicated table 840, 845—labelled public.config_stream—comprises one or more of the following fields: site identifier, timestamp, row index (site-unique index on the rows of this table, of possible use for speeding up reduce operations), initiator (identity of the instigator of the change; initially it contains the keys 'user' and 'app'), action (records the type of action being applied to the configuration. It can be 'I' for Insert, 'U' for Update, or 'D' for Delete), class (type of fact being modified. Initially this is the same as the configuration schema table name, which seems logical—the extant table names were created to hold column facts which are related in our application—but if desired the class names could diverge from the table names over time), row_key (the set of column names and column values which uniquely specify a row in the table. For example, Zone_Configuration requires a site unique identifier and zone unique identifier to uniquely specify a row), row_data (set of column names and column values which hold the relevant facts about the row), and so on.

Transferring Configuration Changes from One Table to Many (Cloud Server Side)

When a configuration-changed record is replicated from an intelligent gateway to the cloud server, another trigger procedure executes at the cloud server database server. This trigger is very similar to the intelligent gateway trigger described above; it assembles a data object (e.g., JSON) string which records the change and sends it to a listener process 860 using NOTIFY. When the listener process 860 receives the notification, it uses the import function in a configuration module to update the site configuration records in the cloud server configuration schema to reflect the change.

Configuration Module

Each fact which is stored in the single replication table can pass through the import/export functions (e.g., Python VAPI API import/export functions) maintained in a configuration module. The purpose of these functions is to enable the single replication table to hold facts which are agnostic to the particular schema version they are exported from or being imported to. During an import or export process, the trigger sends all the relevant information to the listener process to finish exporting the change to the single replication table. The listener process is notified of any configuration changes by the trigger using NOTIFY. Upon receiving this notification, the listener process reads the entries from a queue table, call a translation function to insert the serialized record into the single replication table, and then delete the entries from the queue table. Since the listener process is not guaranteed to never go away, an entry in a monitor module is added to restart the listener process, should it every go away. In addition, the listener process can process all entries in the queue table as part of its startup so that any changes that were made while the listener process wasn't running can get exported to the single replication table. In some implementations, the listener process on the intelligent gateway is called the Export Listener and the listener process on the cloud server is called the Import Listener. The database table serving as the queue on the intelligent gateway is called public.config_stream_queue and the database table serving as the queue on the cloud server is called public.server_config_stream_queue. Both can have the structure show in in Table 3.

TABLE 3

CREATE TABLE if not exists public.config_stream_queue (
   row_index BIGSERIAL,
   data JSONB NOT NULL,
   PRIMARY KEY (row_index) -- fast to query on site, date/time;
row_index enforces uniqueness
);

When the intelligent gateway is running a later version of code than the cloud server, the replicated configuration information from that intelligent gateway may contain fact keys which cloud server doesn't yet know about (because the new code added a column or table). This case is handled by the import function. Any information in the replicated configuration data which will not 'fit' into the schema causes a log message, but is otherwise harmless. Although the new information will not be stored in the old configuration tables (there's no place for it), it remains in the single replication table. This allows it to be imported into the schema once it has been updated. This feature allows data model on either the intelligent gateway or the cloud server to be of different versions without breaking anything, and is lossless—information stored by newer code is never lost because of a downgrade to older code.

EXAMPLES

In some embodiments, an intelligent gateway coupled to at least one ventilator and at least one temperature adjustment assembly is disclosed. The ventilator is configured to circulate fresh air into buildings, and the temperature adjustment assembly is configured to condition the air within the buildings. The intelligent gateway is configured to receive an updated value of an indicator from a device communicatively coupled to a building, wherein the indicator is identified using an indicator identifier in a specification data structure maintained by the intelligent gateway, and wherein the device comprises one or more sensors. The specification data structure can be maintained in a markup language format. The one or more sensors is bound to one or more group functions. the one or more sensors measure temperature, humidity, pressure, carbon dioxide level, occupancy, leakage, or any combination thereof. The intelligent gateway is further configured to identify, using the specification data structure, a set of parent indicators associated with the indicator using the indicator identifier. The intelligent gateway is further configured to, for each parent indicator in the set of parent indicators: compute a revised value of the parent indicator using the updated value of the indicator; and generate an alert associated with the parent indicator using the computed revised value of the parent indicator and one or more rules defined in the specification data structure. The intelligent gateway computes the revised value of the parent indicator based on a custom calculation function associated with a group function of the indicator, wherein the custom calculation function is defined in the specification data structure. The intelligent gateway is further configured to, prior to receiving values of the indicator from the device, register the device with the intelligent gateway, wherein the intelligent gateway receives information of the at least sensor associated with the device and one or more group functions to which the one or more sensor is bound, wherein the intelligent gateway creates, in the specification data structure, entries for indicators to represent each of the one or more sensors, and wherein the intelligent gateway recursively creates, in the specification data structure, entries for one or more parent indicators to which each of the indicators contributes. The intelligent gateway further configured to receive a request to unregister an indicator, delete, from the specification data structure, the indicator identified in the request, and delete, from the specification data structure, one or more parent indicators to which the identified indicator is the sole contributor. The intelligent gateway is further configured to create an entry to the alert associated with the parent indicator in an alerts data structure. The intelligent gateway is further configured to maintain a device configuration data structure, wherein the device configuration data structure comprises entries describing devices at a monitored site, wherein the device configuration data structure identifies one or more sensors associated with each of the devices, and wherein the device configuration data structure identifies one or more group functions to the one or more sensors is bound. The intelligent gateway can maintain an in-memory indicator network data structure, wherein the in-memory indicator network data structure comprises a node corresponding to the indicator, and wherein the in-memory indicator network data structure comprises nodes corresponding to parent indicator in the set of parent indicators, and wherein each node in the in-memory indicator network data structure comprises a set of pointers to its parent indicators. The intelligent gateway is further configured to generate states for one or more parent indicators in the set of parent indicators; and transmit, to a remote server, for one or more of the generated states: a level, a message, a value, or any combination thereof. The intelligent gateway is further configured to monitor and control operating conditions of at least one of the ventilator and the temperature adjustment assembly. The intelligent gateway is further configured to adjust operating conditions of at least one of the ventilator and the temperature adjustment assembly based on the one or more computed revised values of the parent indicators.

In some embodiments, a method of operating an air processing system configured to monitor and control the quality and temperature of air within buildings is disclosed. The air processing system includes an intelligent gateway configured to monitor and adjust operating conditions of a ventilator and a temperature adjustment assembly. The method comprises receiving an updated value of an indicator from a device communicatively coupled to a building, wherein the indicator is identified using an indicator identifier in a specification data structure maintained by the intelligent gateway, wherein the device comprises one or more sensors. The method identifies, using the specification data structure, a set of parent indicators associated with the indicator using the indicator identifier. For each parent indicator in the set of parent indicators, the method computes a revised value of the parent indicator using the updated value of the indicator and generates an alert associated with the parent indicator using the computed revised value of the parent indicator and one or more rules defined in the specification data structure.

In some embodiments, at least one non-transitory, computer-readable medium carrying instructions, which when executed by at least one data processor, performs a method for operating an air processing system configured to monitor and control the quality and temperature of air within buildings is disclosed. The air processing system includes an intelligent gateway configured to monitor and adjust operating conditions of a ventilator and a temperature adjustment assembly. The method comprises receiving an updated value of an indicator from a device communicatively coupled to a building, wherein the indicator is identified using an indicator identifier in a specification data structure maintained by the intelligent gateway, and wherein the device comprises one or more sensors. The method identifies, using the specification data structure, a set of parent indicators associated with the indicator using the indicator identifier. For each parent indicator in the set of parent indicators, the method computes a revised value of the indicator; and generates an alert associated with the parent indicator using the computed revised value of the parent indicator and one or more rules defined in the specification data structure.

The systems and methods disclosed herein offer several advantages over traditional HVAC systems. An intelligent gateway connected to a dedicated outdoor air system (DOAS) with integrated heat recovery (e.g., a countercurrent heat exchanger) for ventilation in combination with separate equipment for the heating/cooling temperature adjustment assembly provides improved operational and air quality efficiencies including control of temperature, pressure, humidity, quantities of $CO_2$, CO, and/or volatile organic compounds present in the air, and other qualities. The dedicated outdoor air systems can provide more reliable and more efficient temperature control and indoor air quality characteristics. Further, the temperature adjustment systems can provide better temperature control and indoor air comfort as compared to traditional systems. From the foregoing it will be appreciated that, although specific embodiments of the technology have been described herein for purposes of illustration, various modifications may be made without deviating from the spirit and scope of the technology. For example, while heat exchanger has been discussed in the context of aluminum counterflow heat exchangers, other heat exchange systems and configurations may be used.

Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. An intelligent gateway coupled to a first ventilator or a first temperature adjustment assembly in a first portion of a building and a second ventilator or second temperature adjustment assembly in a second portion of the building, wherein the first ventilator or second ventilator is configured to circulate fresh air into flail the building, and the first temperature adjustment assembly or the second temperature adjustment assembly is configured to condition air within the building, wherein the intelligent gateway is configured to:

receive an updated value of an indicator from a device communicatively coupled to the building,
wherein the indicator is identified using an indicator identifier in a specification data structure maintained by the intelligent gateway, and
wherein the device comprises one or more sensors;

identify, using the specification data structure, a set of parent indicators associated with the indicator using the indicator identifier;
wherein each parent indicator associated with the indicator has a value that is derived based at least in part on a value of the indicator; and
wherein the set of parent indicators comprise a first parent indicator relating to a first comfort parameter in the first portion of the building and a second parent indicator relating to a second comfort parameter in the second portion of the building;

for each respective parent indicator in the set of parent indicators:
compute a revised value of the respective parent indicator using the updated value of the indicator; and
generate an alert associated with the respective parent indicator using the computed revised value of the respective parent indicator and one or more rules defined in the specification data structure;

identify, using the specification data structure, a third parent indicator associated with the first parent indicator and the second parent indicator;

compute a revised value of the third parent indicator using a revised value of the first parent indicator or a revised value of the second parent indicator; and control operating conditions of the first ventilator or first temperature adjustment assembly and the second ventilator or second temperature adjustment assembly by adjusting the first comfort parameter and the second comfort parameter based on the revised value of the third parent indicator.

2. The intelligent gateway of claim 1, wherein the one or more sensors is bound to one or more group functions.

3. The intelligent gateway of claim 1, wherein the one or more sensors measure:
temperature,
humidity,
pressure,
carbon dioxide level,
occupancy,
leakage,
or any combination thereof.

4. The intelligent gateway of claim 1, wherein the intelligent gateway is further configured to:
prior to receiving values of the indicator from the device:
register the device with the intelligent gateway,
wherein the intelligent gateway receives information of the one or more sensors associated with the device and one or more group functions to which the one or more sensors is bound,
wherein the intelligent gateway creates, in the specification data structure, entries for indicators to represent each of the one or more sensors, and
wherein the intelligent gateway recursively creates, in the specification data structure, entries for one or more parent indicators to which each of the indicators contributes.

5. The intelligent gateway of claim 1, wherein the intelligent gateway is further configured to:
receive a request to unregister a specified indicator in the specification data structure;
delete, from the specification data structure, the specified indicator identified in the request; and
delete, from the specification data structure, one or more parent indicators to which the specified indicator is a sole contributor.

6. The intelligent gateway of claim 1, wherein the intelligent gateway computes the revised value of the third parent indicator based on a custom calculation function associated with a group function of the indicator, the first parent indicator, or the second parent indicator, and
wherein the custom calculation function is defined in the specification data structure.

7. The intelligent gateway of claim 1, wherein the intelligent gateway is further configured to create an entry to the alert associated with the third parent indicator in an alerts data structure.

8. The intelligent gateway of claim 1, wherein the intelligent gateway is further configured to maintain a device configuration data structure,
wherein the device configuration data structure comprises entries describing devices at a monitored site,
wherein the device configuration data structure identifies one or more sensors associated with each of the devices, and
wherein the device configuration data structure identifies one or more group functions to the one or more sensors is bound.

9. The intelligent gateway of claim 1, wherein the specification data structure is maintained in a markup language format.

10. The intelligent gateway of claim 1, wherein the intelligent gateway maintains an in-memory indicator network data structure,
wherein the in-memory indicator network data structure comprises a node corresponding to the indicator,
wherein the in-memory indicator network data structure comprises nodes corresponding to each parent indicator in the set of parent indicators, and
wherein each node in the in-memory indicator network data structure comprises a set of pointers to its parent indicators.

11. The intelligent gateway of claim 1, wherein the intelligent gateway is further configured to:
generate states for one or more parent indicators in the set of parent indicators; and
transmit, to a remote server, for one or more of the generated states: a level, a message, a value, or any combination thereof.

12. A method of operating an air processing system configured to monitor and control quality and temperature of air within a building, wherein the air processing system includes an intelligent gateway configured to monitor and adjust operating conditions of a first ventilator or a first temperature adjustment assembly in a first portion of a building and a second ventilator or second temperature adjustment assembly in a second portion of the building, the method comprising:
receiving an updated value of an indicator from a device communicatively coupled to the building,
wherein the indicator is identified using an indicator identifier in a specification data structure maintained by the intelligent gateway, and
wherein the device comprises one or more sensors;
identifying, using the specification data structure, a set of parent indicators associated with the indicator using the indicator identifier;
wherein each parent indicator associated with the indicator has a value that is derived based at least in part on a value of the indicator; and
wherein the set of parent indicators comprise a first parent indicator relating to a first comfort parameter in the first portion of the building and a second parent indicator relating to a second comfort parameter in the second portion of the building;
for each respective parent indicator in the set of parent indicators:
computing a revised value of the respective parent indicator using the updated value of the indicator; and
generating an alert associated with the respective parent indicator using the computed revised value of the respective parent indicator and one or more rules defined in the specification data structure;
identifying, using the specification data structure, a third parent indicator associated with the first parent indicator and the second parent indicator;
computing a revised value of the third parent indicator using a revised value of the first parent indicator or a revised value of the second parent indicator; and
controlling operating conditions of the first ventilator or first temperature adjustment assembly and the second ventilator or second temperature adjustment assembly by adjusting the first comfort parameter and the second comfort parameter based on the revised value of the third parent indicator.

13. The method of claim 12, wherein the one or more sensors measure:
temperature,
humidity,
pressure,
carbon dioxide level,
occupancy,
leakage,
or any combination thereof.

14. The method of claim 12, further comprising:
prior to receiving values of the indicator from the device:
registering the device with the intelligent gateway,
wherein the intelligent gateway receives information of the one or more sensors associated with the device and one or more group functions to which the one or more sensors is bound,
wherein the intelligent gateway creates, in the specification data structure, entries for indicators to represent each of the one or more sensors, and
wherein the intelligent gateway recursively creates, in the specification data structure, entries for one or more parent indicators to which each of the indicators contributes.

15. The method of claim 12, wherein the revised value of the third parent indicator based on a custom is computed using a calculation function associated with a group function of the indicator, the first parent indicator, or the second parent indicator, and wherein the custom calculation function is defined in the specification data structure.

16. The method of claim 12, wherein the method further comprises maintaining an in-memory indicator network data structure, wherein the in-memory indicator network data structure comprises a node corresponding to the indicator, and wherein the in-memory indicator network data structure comprises nodes corresponding to each parent indicator in the set of parent indicators, and wherein each node in the in-memory indicator network data structure comprises a set of pointers to its parent indicators.

17. The method of claim 12, further comprising:

generate states for one or more parent indicators in the set of parent indicators; and transmit, to a remote server, for one or more of the generated states: a level, a message, a value, or any combination thereof.

18. At least one non-transitory, computer-readable medium carrying instructions, which when executed by at least one data processor, performs a method for operating a distributed metrics system, wherein the distributed metrics system includes an intelligent gateway configured to monitor and adjust operating conditions of the distributed metrics system, the method comprising:

receiving an updated value of an indicator from a device communicatively coupled to a building, wherein the indicator is identified using an indicator identifier in a specification data structure maintained by the intelligent gateway, wherein an indicator is associated with a metric, wherein the metric is selected from a set of metrics, and wherein the set of metrics comprise at least one metric representing a physical quantity and at least one metric representing a derived quantity;

identifying, using the specification data structure, a set of parent indicators associated with the indicator using the indicator identifier;

wherein each parent indicator associated with the indicator has a value that is derived based at least in part on a value of the indicator; and wherein the set of parent indicators comprise a first parent indicator relating to a first comfort parameter in a first area monitored by the distributed metrics system and a second parent indicator relating to a second comfort parameter in a second area monitored by the distributed metrics system;

for each respective parent indicator in the set of parent indicators:

computing a revised value of the respective parent indicator using the updated value of the indicator; and generating an alert associated with the respective parent indicator using the computed revised value of the respective parent indicator and one or more rules defined in the specification data structure; and identifying, using the specification data structure, a third parent indicator associated with the first parent indicator and the second parent indicator;

computing a revised value of the third parent indicator using a revised value of the first parent indicator or a revised value of the second parent indicator; and controlling operating conditions of the distributed metrics system by adjusting the first comfort parameter and the second comfort parameter based on the one or more computed revised values of the third parent indicator.

19. The intelligent gateway of claim 1, wherein the intelligent gateway is further configured to:

receive initial values of a plurality of indicators from a plurality of devices communicatively coupled to the building; and compute an initial value for another set of parent indicators based on the initial values of the plurality of indicators, the other set of parent indicators including one or more parent indicators associated with each of the plurality of indicators and comprising the set of parent indicators associated with the indicator;

wherein computing the revised value of each respective parent indicator in the set of parent indicators comprises applying a function to the initial value of the respective parent indicator and the updated value of the indicator to compute the revised value.

20. The intelligent gateway of claim 19, wherein the plurality of devices communicatively coupled to the building comprise two or more types of sensors, and wherein a parent indicator in the set of parent indicators represents a comfort parameter that is different from a parameter measured by either of the two or more types of sensors.

* * * * *